US011509816B2

(12) United States Patent
Ebata et al.

(10) Patent No.: US 11,509,816 B2
(45) Date of Patent: Nov. 22, 2022

(54) IMAGE PROCESSING APPARATUS, IMAGE PICKUP APPARATUS, AND CONTROL METHOD OF IMAGE PROCESSING APPARATUS

(71) Applicant: CANON KABUSHIKI KAISHA, Tokyo (JP)

(72) Inventors: Yuya Ebata, Kanagawa (JP); Hiroyuki Yaguchi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 17/165,693

(22) Filed: Feb. 2, 2021

(65) Prior Publication Data
US 2021/0243361 A1    Aug. 5, 2021

(30) Foreign Application Priority Data

Feb. 5, 2020   (JP) .............................. JP2020-017856
Apr. 8, 2020   (JP) .............................. JP2020-069707

(51) Int. Cl.
*H04N 5/232*    (2006.01)
*H04N 5/225*    (2006.01)

(52) U.S. Cl.
CPC ....... *H04N 5/23219* (2013.01); *H04N 5/2258* (2013.01); *H04N 5/23222* (2013.01); *H04N 5/23293* (2013.01); *H04N 5/23296* (2013.01)

(58) Field of Classification Search
CPC .. H04N 5/232; H04N 5/23219; H04N 5/2258; H04N 5/23222; G06T 13/40
See application file for complete search history.

(56) References Cited

U.S. PATENT DOCUMENTS

2011/0006978 A1*   1/2011   Yuan .................... G06F 3/0481
                                                351/209

FOREIGN PATENT DOCUMENTS

JP          2004-008323 A      1/2004
JP          5828070 B2        12/2015

* cited by examiner

*Primary Examiner* — Yogesh K Aggarwal
(74) *Attorney, Agent, or Firm* — Cowan, Liebowitz & Latman, P.C.

(57) ABSTRACT

An image processing apparatus includes a display unit configured to display an image captured via an optical system, an estimation unit configured to estimate a gazing point position of a user on a display unit, and a control unit configured to change a zoom position of an image displayed on the display unit. When start is instructed of image pickup assist control, the control unit zooms out the image displayed on the display unit from a first zoom position to a second zoom position on more wide-angle side than the first zoom position. When stop is instructed of the image pickup assist control, the control unit zooms in on a zoom-out image from the second zoom position to a third zoom position on more telephoto side than the second zoom position, based on the gazing point position estimated by the estimation unit.

17 Claims, 24 Drawing Sheets

IMAGE PROCESSING APPARATUS, IMAGE PICKUP APPARATUS, AND CONTROL METHOD OF IMAGE PROCESSING APPARATUS

BACKGROUND OF THE INVENTION

Field of the Invention

The present invention relates to an image pickup apparatus having an image pickup assist function for recapture an object that is lost from an image pickup angle of view.

Description of the Related Art

Conventionally, an image pickup apparatus is known that has an image pickup assist function making it easier to recapture an object that is lost from a narrow image pickup angle of view, such as that in a telephoto image pickup. For example, when a user starts the image pickup assist via an operation member in order to recapture an object that is lost from the image pickup angle of view, the object is captured by automatically zooming out to a wide-angle direction, and thereafter when the user cancels the image pickup assist, zoom in is automatically performed to a telephoto direction (framing assist).

Japanese Patent Laid-Open No. ("JP") 2004-8323 discloses a technique for recognizing an object intended by a user based on information on a position of a visual line of the user looking into a finder. Japanese Patent No. ("JP Patent No.") 5828070 discloses a technique for performing focus control based on a variation in a position of a visual line and distance information.

However, when the object is lost from the image pickup angle of view and is necessary to be recaptured, the targeted object temporarily disappears. Therefore, it is difficult to apply techniques disclosed in JP 2004-8323 and JP Patent No. 5828070.

SUMMARY OF THE INVENTION

The present invention provides an image processing apparatus, an image pickup apparatus, and a control method of an image processing apparatus each of which can easily recapture an object that is lost from an image pickup angle of view and can prevent a loss of an image pickup opportunity.

An image processing apparatus according to one aspect of the present invention includes a display unit configured to display an image captured via an optical system, an estimation unit configured to estimate a gazing point position of a user on a display unit, and a control unit configured to change a zoom position of an image displayed on the display unit. When start is instructed of image pickup assist control, the control unit zooms out the image displayed on the display unit from a first zoom position to a second zoom position on more wide-angle side than the first zoom position. When stop is instructed of the image pickup assist control, the control unit zooms in on a zoom-out image from the second zoom position to a third zoom position on more telephoto side than the second zoom position, based on the gazing point position estimated by the estimation unit.

A control method of the above image processing apparatus constitutes another aspect of the present invention.

An image processing apparatus according to one aspect of the present invention includes a display unit configured to a display an image captured via an optical system, an estimation unit configured to estimate a gazing point position of a user on the display unit, and a control unit configured to change a zoom position of an image displayed on the display unit. When the control unit determines that the gazing point position has been changed, the control unit changes the zoom position.

Further features of the present invention will become apparent from the following description of exemplary embodiments with reference to the attached drawings.

BRIEF DESCRIPTION OF THE DRAWINGS

FIG. 1 is a block diagram illustrating an image pickup apparatus according to a fourth embodiment.

DESCRIPTION OF THE EMBODIMENTS

Referring now to the accompanying drawings, a description will be given of embodiments according to the present invention.

First Embodiment

Figure 1:
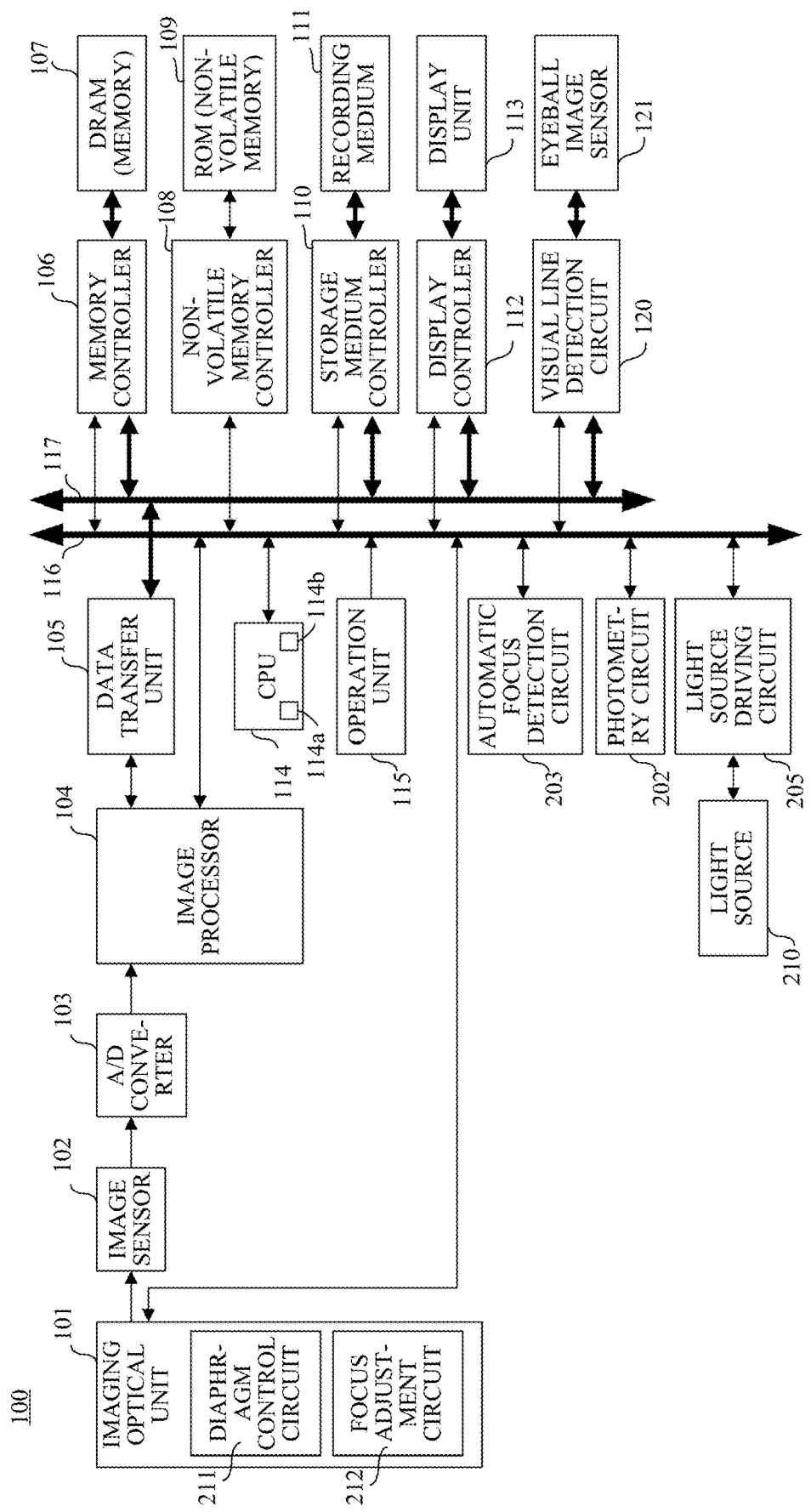
FIG. 1 is a block diagram illustrating an image pickup apparatus according to each of first to third embodiments.
Figure 2:
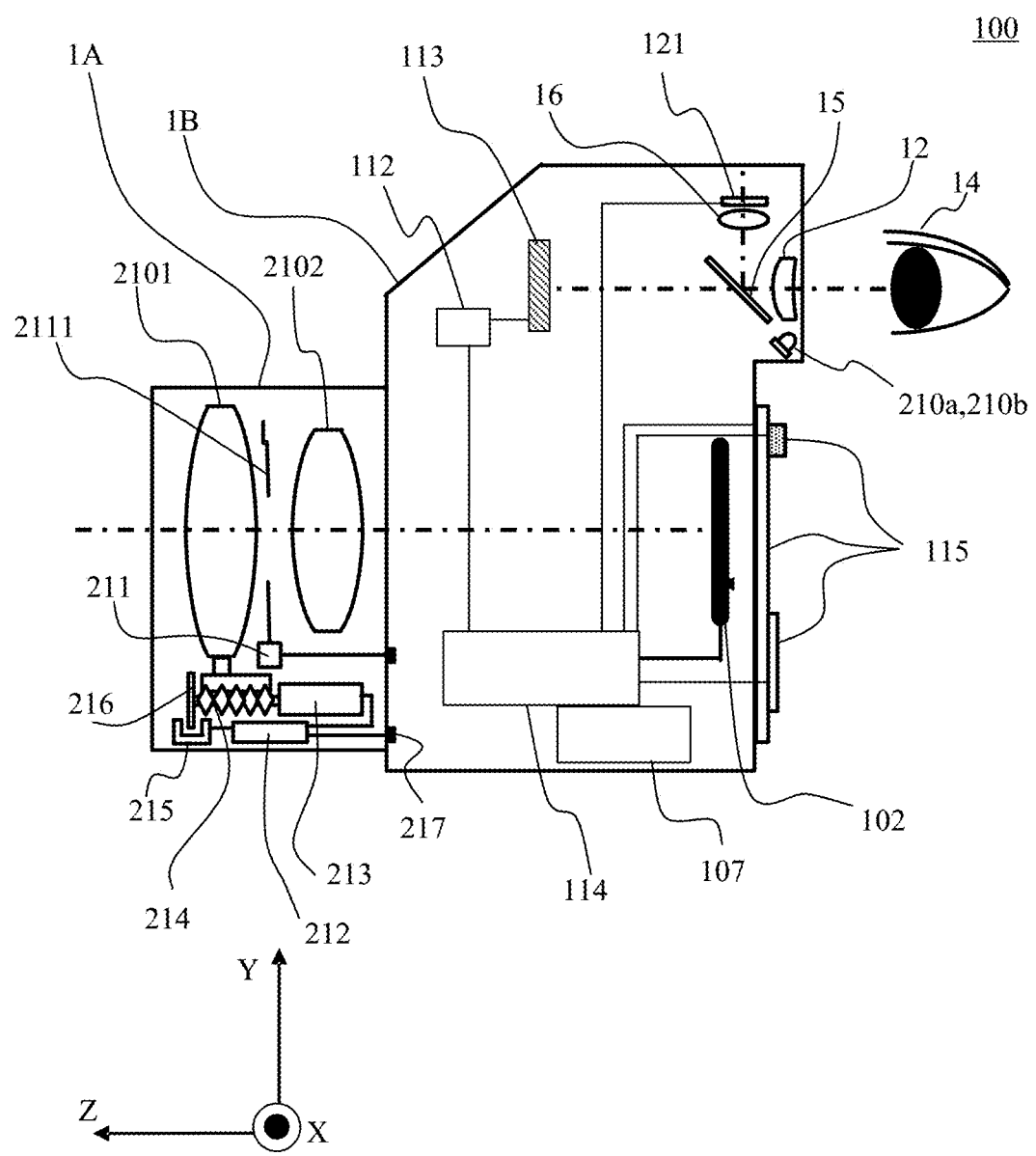
FIG. 2 is a sectional view illustrating the image pickup apparatus according to each of the first to third embodiments.

First, a description will be given of an image pickup apparatus (image processing apparatus) according to a first embodiment of the present invention with reference to FIGS. 1 and 2. FIG. 1 is a block diagram illustrating a digital camera 100 as an image pickup apparatus. FIG. 2 is a sectional view illustrating the digital camera 100. In FIG. 1 and FIG. 2, corresponding elements are represented by same reference numerals.

In FIG. 1, the imaging optical unit 101 includes an optical system as an image pickup optical system that includes a plurality of lens units having a focus lens and an image stabilization lens, a diaphragm, and the like. The imaging optical unit 101 includes a diaphragm control circuit 211 and a focus adjustment circuit 212. At a time of image pickup, the imaging optical unit 101 adjusts focus with the focus adjustment circuit 212, adjusts an exposure with the diaphragm control circuit 211, performs image stabilization, etc., and forms an optical image on an image sensor 102. The image sensor 102 has a photoelectric conversion function for converting an optical image into an electric signal, that is an analog image signal, and includes a CCD sensor, a CMOS sensor, or the like. An A/D converter 103 is configured to convert the analog image signal from the image sensor 102 into a digital image signal. The converted image data is input to an image processor 104 in a subsequent stage. A bus 116 is a system bus mainly configured to transfer a control signal for each block from a CPU 114 or the like. A bus 117 is a data bus mainly configured to transfer image data.

The CPU 114 includes a microcomputer or the like controlling the entire image processing apparatus, and is configured to instruct operation to each functional block, and to execute various control processing. The CPU 114 is configured to perform operations required for various control processing. The CPU 114 is configured to control, via a bus 116, the image sensor 102, the image processor 104, a data transfer unit 105, a memory controller 106, a non-volatile memory controller 108, a storage medium controller 110, a display controller 112, and an operation unit 115. The CPU 114 is configured to control, via the bus 116, a visual line detection circuit 120, a photometry circuit 202, an automatic focus detection circuit 203, and a light source driving circuit 205. The microcomputer included in the CPU 114 realizes each process of this embodiment by executing a program recorded in a ROM 109. The CPU 114 is configured to control the lens and the diaphragm of the imaging optical unit 101, and to acquire information such as a focal length. The CPU 114 includes an estimation unit 114a and a control unit 114b. The estimation unit 114a is configured to estimate a gazing point position of a user on the display unit 113 by using the visual line detection circuit 120 and an eyeball image sensor 121. The control unit 114b is configured to change the focal length of the imaging optical unit 101.

The data transfer unit 105 includes a plurality of DMACs (Direct Memory Access Controllers) configured to perform data transfer. A DRAM (memory) 107 is a memory unit configured to store data, and has a storage capacity sufficient to store a predetermined number of still images, a motion image of a predetermined time, data such as audio, constants for operation of the CPU 114, a program, and the like. The memory controller 106 is configured to write data to and read data from the DRAM 107 in response to an instruction from the CPU 114 or from the data transfer unit 105. The non-volatile memory controller 108 is configured to write data to and read data from the ROM (nonvolatile memory) 109 in response to an instruction from the CPU 114. The ROM 109 is a memory that is electrically erasable and recordable, and is an EEPROM or the like. The ROM 109 is configured to store constants, programs, and the like for the operation of the CPU 114.

The image processor 104 includes various image processors, a buffer memory, and the like, and is configured to properly perform lateral chromatic aberration correction, development processing, noise reduction processing, geometric deformation, enlargement/reduction processing (resizing processing), and the like on the image data. The image processor 104 includes an image pickup correction unit configured to properly perform pixel correction, black level correction, shading correction, defective pixel correction, and the like on the image data acquired by the conversion by the A/D converter 103.

A recording medium 111 is a recording medium such as an SD card, and is controlled by a storage medium controller 110 to record image data and to read recorded data. The display unit 113 includes a liquid crystal display and an electronic viewfinder, is controlled by the display controller 112, and displays various image data, such as an image captured via the imaging optical unit 101, transferred from the image processor 104, a menu screen, and the like. At a time before a still image pickup or at a time of motion image pickup, image data input from the A/D converter 103 is processed and displayed in real time.

The operation unit 115 includes a switch, a button, a touch panel, and the like, each of which are operated by the user, and is used for operation such as on/off of power and on/off of a shutter. The operation unit includes a dedicated button for executing the image pickup assist function, and when the dedicated button is pressed, the image pickup assist starts.

The light source driving circuit 205 is configured to drive light sources 210 (210a, 210b) for illuminating a user's eyeball. The visual line detection circuit 120 is configured to detect a visual line direction based on a positional relationship between an eyeball imaged on the eyeball image sensor 121 and images of cornea reflections (cornea reflection images) of the light sources 210.

In FIG. 2, a reference numeral 1A denotes an image pickup lens as a lens apparatus in a lens interchangeable camera, and corresponds to the imaging optical unit 101 of FIG. 1. In this embodiment, for convenience, the image pickup lens 1A is illustrated as if consisting of two lenses 2101 and 2102 inside, but the image pickup lens 1A actually includes more lenses. A reference numeral 1B denotes a camera body frame (camera main body). The image sensor 102 is disposed on a planned image plane of the image pickup lens 1A of the digital camera 100. An eyepiece lens 12 is disposed for observing an object image displayed on the display unit 113.

Reference numerals 210a and 210b denote light sources configured to illuminate a user's eyeball 14 for detecting the visual line direction from the relationship between the cornea reflection images of the light sources and a pupil. The light sources 210a and 210b include infrared light-emitting diodes and are disposed around an eyepiece lens 12. An illuminated eyeball image and the cornea reflection images of the light sources 210a and 210b are transmitted through the eyepiece lens 12, reflected by a light divider 15, and are formed by a light receiving lens 16 on the image sensor 121 on which an array of photoelectric elements such as CCD are two dimensionally arranged. The light receiving lens 16 positions the pupil of the user's eyeball 14 and the eyeball image sensor 121 in a conjugate imaging relationship. The CPU 14 controls the visual line detection circuit 120, and detects the visual line direction by a predetermined algorithm described later from the positional relationship between the eyeball imaged on the eyeball image sensor 121 and the cornea reflection images of the light sources 210a and 210b.

A reference numeral 2111 denotes a diaphragm included in the image pickup lens 1, a reference numeral 211 denotes a diaphragm control circuit, a reference numeral 213 denotes a lens driving motor, and a reference numeral 214 denotes a lens driving member including a driving gear and the like. A reference numeral 215 denotes a photocoupler, which is configured to detect a rotation of a pulse plate 216 interlocked to the lens driving member 214 and to transmit the rotation (rotation information) to the focus adjustment circuit 212. The focus adjustment circuit 212 is configured to drive the lens driving motor 213 by a predetermined amount based on the rotation information and information on a lens driving amount from a camera side, and to move the image pickup lens 1A to an in-focus point position. A reference numeral 217 denotes a mount contact as an interface between the image pickup lens 1A and the camera body frame 1B. The operation unit 115 includes an operation member such as a touch panel compatible liquid crystal, an image pickup assist button, and a button-type cross key. The operation unit 115 is used for control by image pickup assist operation described later. In this embodiment, the digital camera 100 as an image pickup apparatus includes the camera body frame (camera main body) 1B and the image pickup lens (interchangeable lens) 1A that is detachably attachable to the camera body frame 1B, but this embodiment can be also applied to an image pickup apparatus in which a camera main body and an image pickup lens are integrally configured.

Figure 3:
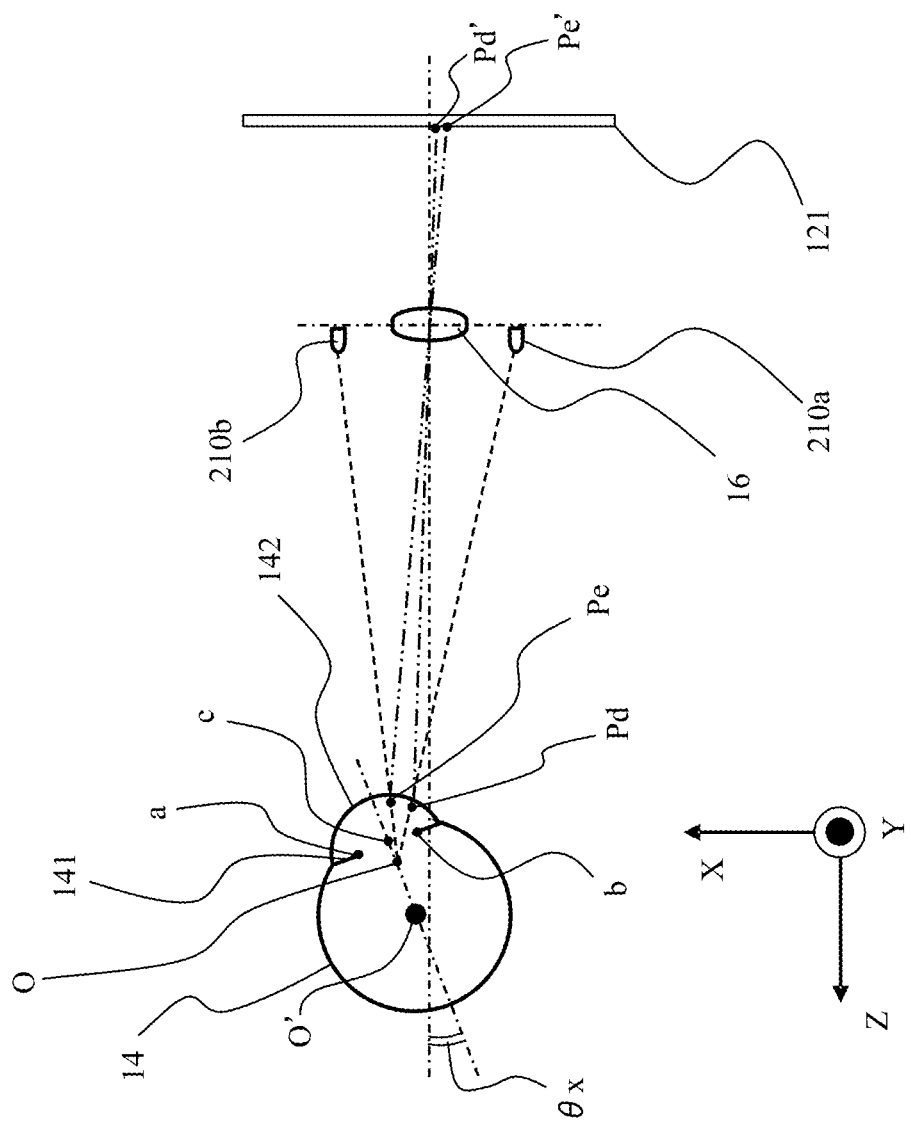
FIG. 3 is an explanatory diagram illustrating a principle of a visual line detection method according to each embodiment.

Next, a description will be given of a visual line detection method according to this embodiment with reference to FIGS. 3 to 5. FIG. 3 is an explanatory diagram illustrating a principle of the visual line detection method, and is an explanatory diagram illustrating an optical system for performing visual line detection. In FIG. 2, the light sources 210a and 210b are light sources, such as light emitting diodes, emitting insensible infrared light to the user. The light sources 210a and 210b are arranged substantially symmetrically with respect to an optical axis of the light receiving lens 16 and illuminate the eyeball 14 of a user. Part of the illumination light reflected by the eyeball 14 are focused on the eyeball image sensor 121 by the light receiving lens 16.

Figure 4A:
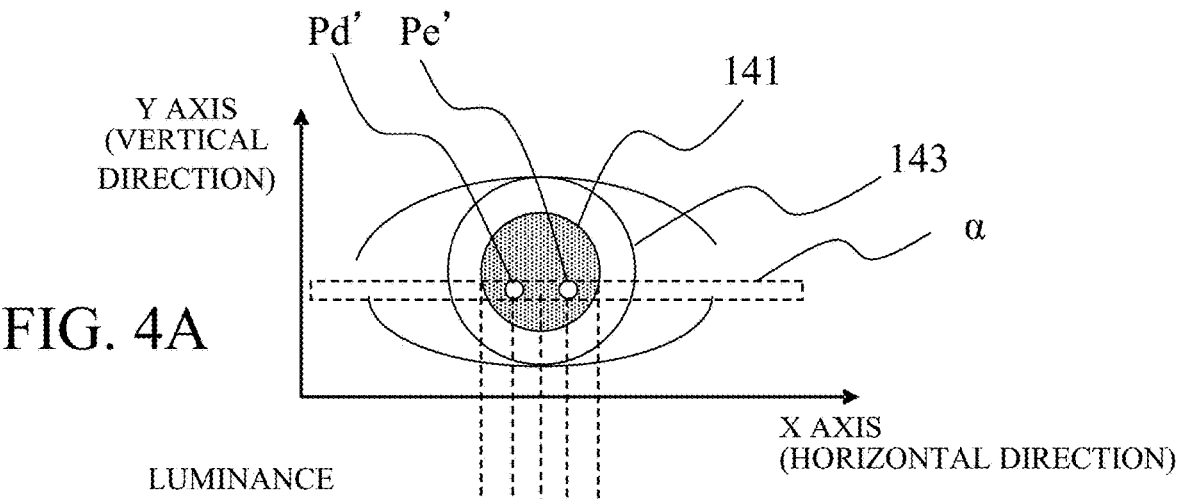
FIGS. 4A and 4B are diagrams illustrating an eyeball image projected on an eyeball image sensor and an output intensity of the eyeball image sensor according to each embodiment.
Figure 4B:
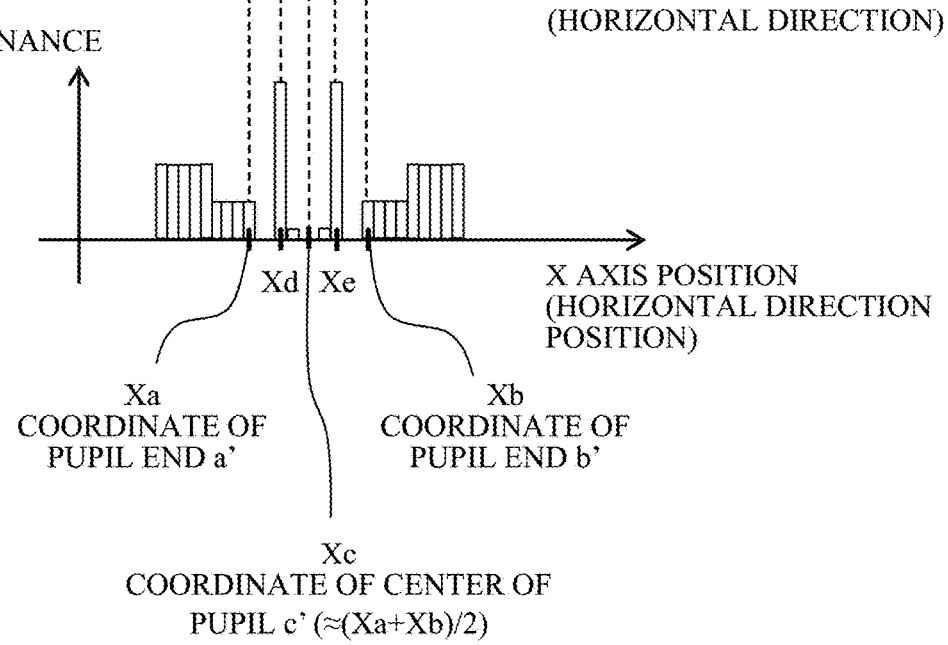

FIG. 4A is a schematic diagram illustrating the eyeball image projected on the eyeball image sensor 121, and FIG. 4B is a diagram illustrating output intensities of the CCD on the eyeball image sensor 121. FIG. 5 is a flowchart illustrating a visual line detection routine, that is a visual line detection method. The visual line detection routine illustrated in FIG. 5 is executed by a gazing point position estimator, as an estimation unit, including the CPU 114 and the visual line detection circuit 120.

Figure 5:
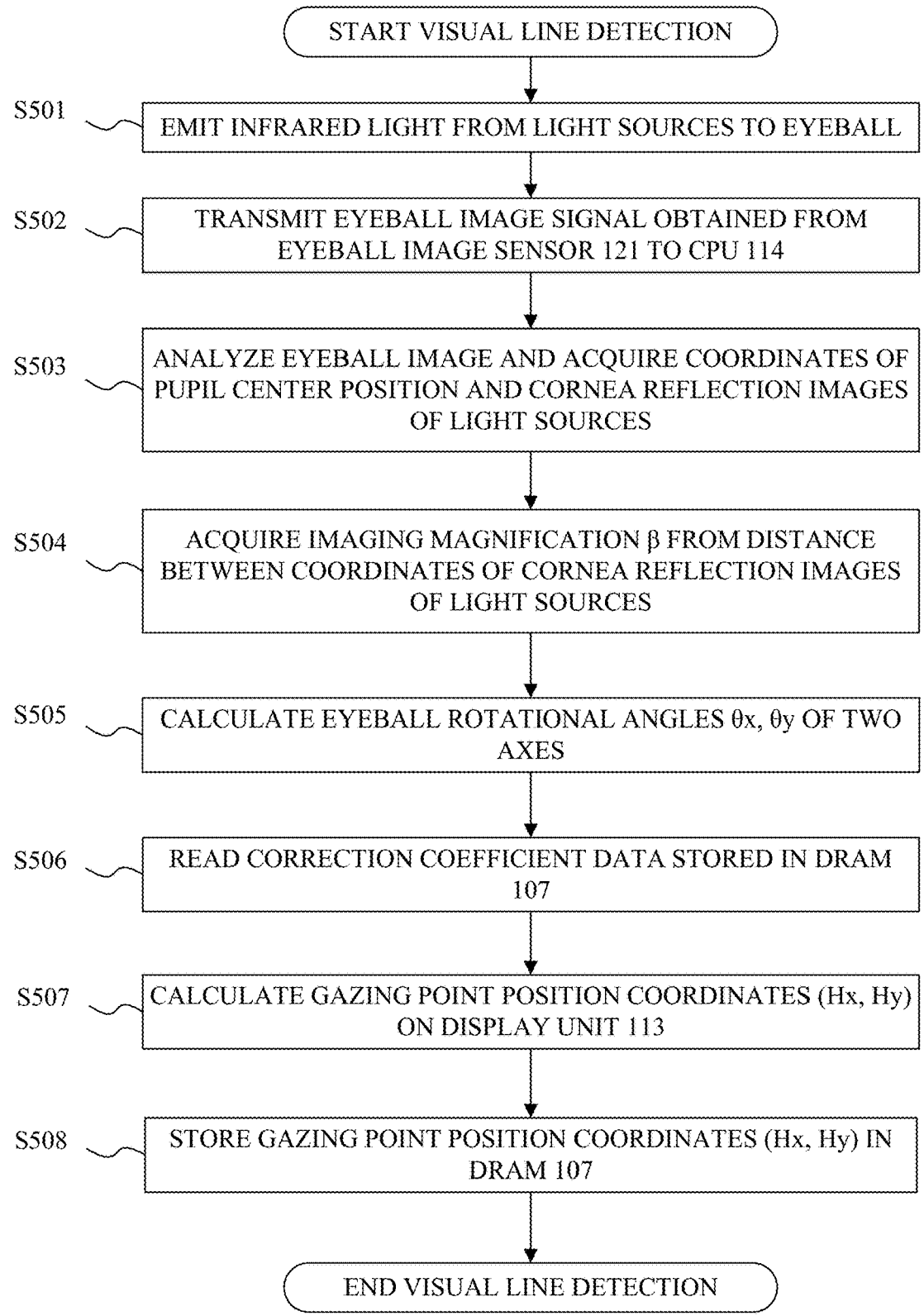
FIG. 5 is a flowchart illustrating a visual line detection method according to each embodiment.

In FIG. 5, when the visual line detection routine starts, first, in step S501, the CPU 114 controls the light source driving circuit 205 to drive the light sources 210a and 210b. The light sources 210a and 210b emit infrared light toward the user's eyeball 14 under the control of the CPU 114. The user's eyeball image illuminated by the infrared light from the light sources 210a and 210b is imaged via the light receiving lens 16 on the eyeball image sensor 121, and is photoelectrically converted by the eyeball image sensor 121, and thereby the eyeball image can be processed as an electric signal, that is also referred to as an eyeball image signal hereinafter. Subsequently, in step S502, the eyeball image signal obtained from the eyeball image sensor 121 is transmitted to the CPU 114.

Subsequently, in step S503, the CPU 114 acquires coordinates of points corresponding to cornea reflection images Pd and Pe of the light sources 210a and 210b, and a pupil center c as illustrated in FIG. 3, based on information on the eyeball image signal obtained in step S502. The infrared light emitted from the light sources 210a and 210b illuminates a cornea 142 of the user's eyeball 14. At this time, the cornea reflection images Pd and Pe formed by part of the infrared light reflected on a surface of the cornea 142 are focused by the light receiving lens 16 and imaged on the eyeball image sensor 121 (on points Pd' and Pe' in the drawing). Similarly, the light beams from ends a and b of a pupil 141 are also imaged on the eyeball image sensor 121.

FIG. 4A illustrates an image example of a reflection image acquired from the eyeball image sensor 121. FIG. 4B illustrates an example of luminance information acquired from the eyeball image sensor 121 in an area a of the image example of FIG. 4A. As illustrated in FIG. 4A, a horizontal direction represents an X axis and a vertical direction is a Y axis. Xd and Xe respectively represent coordinates in the X axis direction (horizontal direction) of images Pd' and Pe' which are acquired by imaging the cornea reflection images of the light sources 210a and 210b. Xa and Xb respectively represent coordinates in the X axis direction of images a' and b' which are acquired by imaging the light beams from the ends (pupil ends a and b) of the pupil 14b. In the example of the luminance information in FIG. 4B, luminance of a strong level is obtained at the positions Xd and Xe corresponding to the images Pd' and Pe' acquired by imaging the cornea reflection images of the light sources 210a and 210b. An area between coordinates Xa and Xb, which corresponds to an area of the pupil 141, has a low level of luminance except for positions Xd and Xe. On the other hand, in an area of x coordinate values lower than Xa and an area of x coordinate values higher than Xb, each of which corresponds to an area of an iris 143 in outer side of the pupil 141, a luminance level is obtained of an intermediate value of the above-mentioned two values of luminance. Based on variation information on the luminance level for the positions of the X coordinates, it is possible to acquire the X coordinates Xd and Xe of the images Pd' and Pe' formed by the cornea reflection images of the light sources 210a and 210b, and the X coordinates Xa and Xb of the images a' and b' at the pupil ends.

When a rotation angle θx is small of an optical axis of the eyeball 14 for the optical axis of the light receiving lens 16, a coordinate Xc of a position (referred to as c') corresponding to the pupil center c imaged on the eyeball image sensor 121 can be expressed as Xc≈(Xa+Xb)/2. Thereby, it is possible to estimate the X coordinate of c' corresponding to the center of the pupil imaged on the eyeball image sensor 121, and the cornea reflection images Pd' and Pe' of the light sources 210a and 210b.

Subsequently, in step S504 of FIG. 5, the CPU 114 calculates an imaging magnification β of the eyeball image.

The imaging magnification β is a magnification determined by the position of the eyeball 14 for the light receiving lens 16, and can be substantially acquired as a function of a distance (Xd−Xe) between the cornea reflection images Pd' and Pe'.

Subsequently, in step S505, an eyeball rotational angle (rotation angles θx, θy) of the two axes is calculated. An X coordinate at a midpoint of the cornea reflection images Pd and Pe and an X coordinate of a curvature center O of the cornea 142 substantially match. Therefore, a following expression (1) represents the rotation angle θx of the optical axis of eyeball 14 in a ZX plane, where Oc represents a standard distance from the curvature center O of the cornea 142 to the center c of pupil 141.

$$\theta x = \beta * Oc * \text{SIN } \theta x \{(Xd+Xe)/2\} - Xc \quad (1)$$

In each of FIGS. 3, 4A and 4B, an example is illustrated of calculating the rotation angle θx when the user's eyeball rotates in a plane orthogonal to the Y axis, but when the user's eyeball rotates in a plane orthogonal to the X axis, the rotation angle θy is calculated by the same method.

When the rotation angles θx and θy of the optical axis of the user's eyeball 14 are calculated in step S505, the process proceeds to step S506. In step S506, the CPU 114 reads correction coefficient data stored in the DRAM (memory) 107. Subsequently, in step S507, the CPU 114 uses the rotation angles θx and θy to acquire the position of the user's visual line (position of a point where the user gazes at (gazing point)) on the display unit 113. The following expressions (2) and (3) represent coordinates Hx and Hy, where the gazing point position is assumed to be coordinates (Hx, Hy) corresponding to the center c of the pupil 141 on the display unit 113.

$$Hx = m \times (Ax \times \theta x + Bx) \quad (2)$$

$$Hy = m \times (Ay \times \theta + By) \quad (3)$$

At this time, a coefficient m is a constant determined by a configuration of a finder optical system of the digital camera 100, in other words, a conversion coefficient for converting the rotation angles θx and θy into the position of coordinates corresponding to the center c of the pupil 141 on the display unit 113. The coefficient m is determined in advance and stored in the DRAM 107. Each of Ax, Bx, Ay, and By represents a visual line correction coefficient for correcting individual differences in the visual line of the user, are acquired by performing calibration operation described later, and are stored in the DRAM 107 before the visual line detection routine starts.

After calculating the coordinates (Hx, Hy) of the center c of the pupil 141 on the display unit 113 as described above, in step S508, the CPU 114 stores the calculated coordinates in the DRAM 107 and ends the visual line detection routine illustrated in FIG. 5. The CPU 114 measures how long the position of the visual line stays in a certain area and stores it in the DRAM 107 as a gaze time. This embodiment describes an acquisition method for gazing point coordinates on a display element using the cornea reflection images of the light sources 210a and 210b, but the method is not limited to this, and a method may be used of acquiring the eyeball rotational angle from a captured eyeball image.

Figure 6:
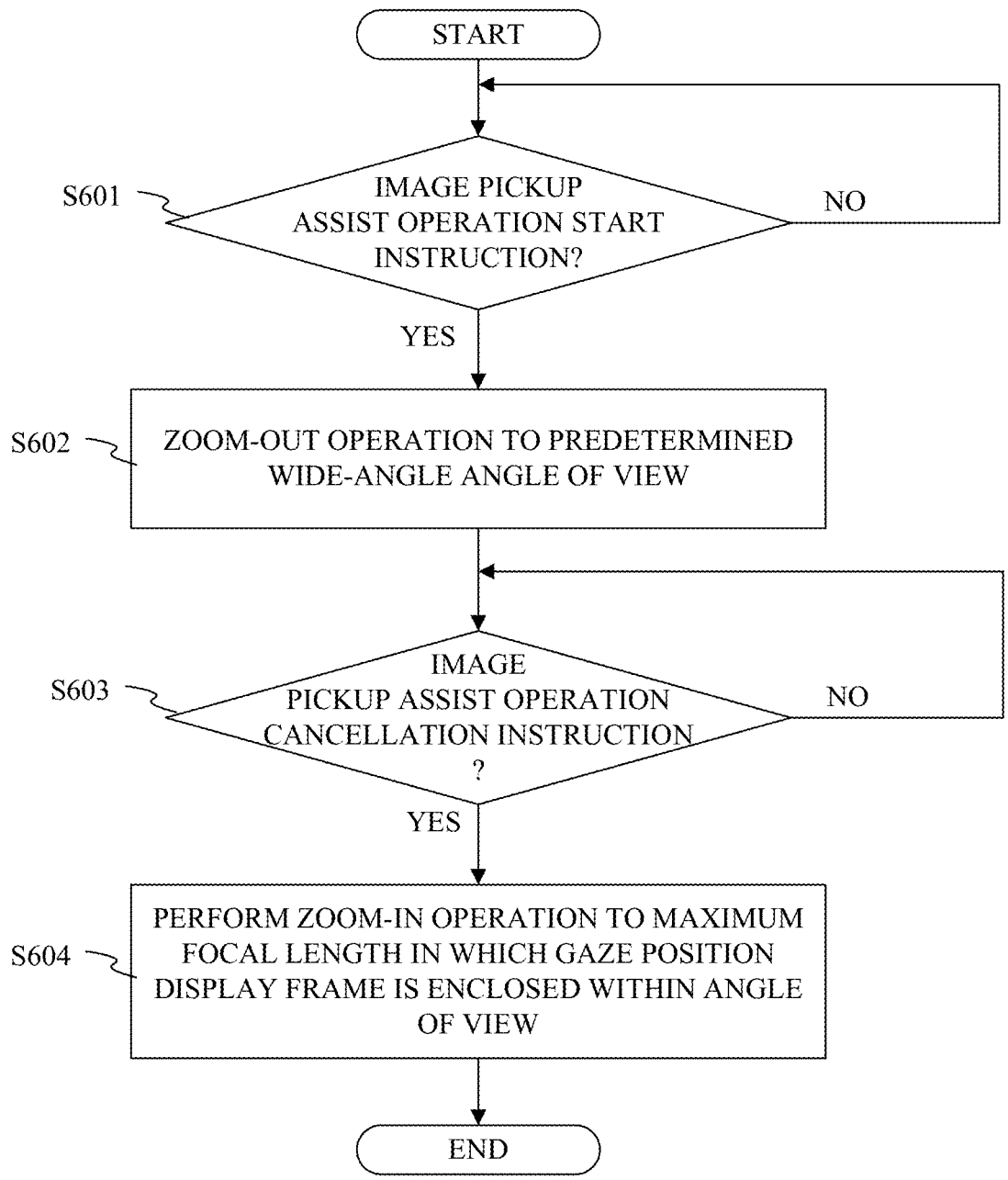
FIG. 6 is a flowchart illustrating a control method according to the first embodiment.
Figure 7C:
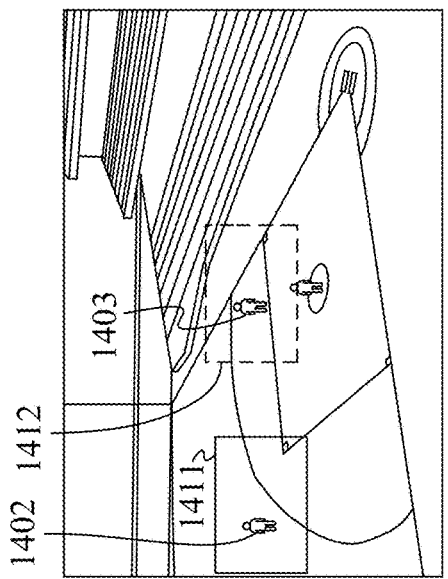
FIGS. 7A to 7C are schematic diagrams each illustrating a display screen of a display unit according to the first embodiment.
Figure 7B:
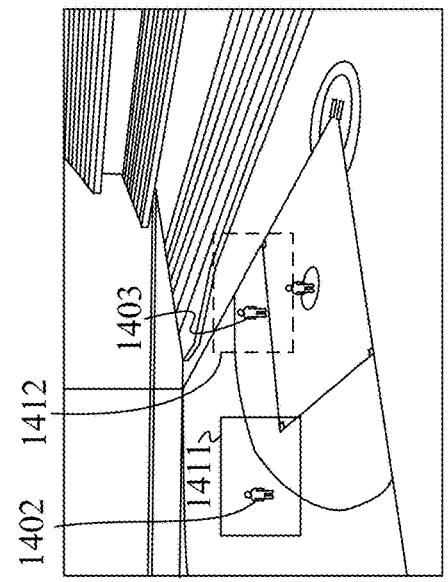
Figure 7A:
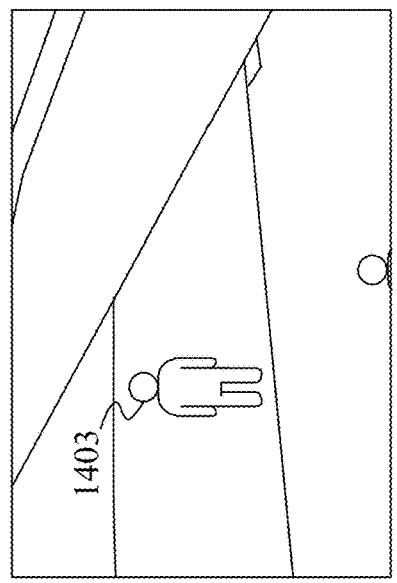

Next, the control method will be described according to this embodiment with reference to FIGS. 6 and 7A to 7C. FIG. 6 is a flowchart illustrating a control method according to this embodiment. Each step in FIG. 6 is mainly executed by the CPU 114. FIGS. 7A to 7C are schematic diagrams each illustrating a display screen of the display unit 113 according to this embodiment.

At a time when the flow of FIG. 6 starts, an object 1403 of FIG. 7A is displayed on the display unit 113. First, in step S601, the CPU 114 determines whether or not the image pickup assist button of the operation unit 115 is pressed and the image pickup assist operation (image pickup assist control) start instruction is input. When the image pickup assist operation start instruction is not input, step S601 is repeated. On the other hand, when the image pickup assist operation start instruction is input, the process proceeds to step S602.

In step S602, the CPU 114 controls the lens driving motor 213 to perform zoom-out operation to a predetermined wide-angle angle of view as illustrated in FIG. 7B. That is, the control unit 114b zooms out the image displayed on the display unit 113 from a first focal length to a second focal length on more wide-angle side than the first focal length. The user can set, to a desired value, the focal length when the zoom-out operation is performed. In FIG. 7B, a reference numeral 1412 denotes an angle of view frame (image pickup angle of view) at the focal length of when the image pickup assist control starts. The angle of view frame 1412 at the focal length of when the image pickup assist control starts becomes smaller in size displayed on the display unit 113 according to the zoom-out operation. A reference numeral 1411 in FIG. 7B denotes a gazing point position display frame including the gazing point position calculated by the visual line detection routine in FIG. 5. The gazing point position display frame 1411 is displayed in the same size as that of the angle of view frame 1412 at the focal length of when the image pickup assist control starts. In FIG. 7B, the gazing point position of the user is around object 1402.

Subsequently, in step S603, the CPU 114 determines whether or not the pressing of the image pickup assist button is released and a cancellation (stop) instruction for the image pickup assist operation is input. When the cancellation of the image pickup assist operation is not instructed, step S603 is repeated. On the other hand, when the pressing of the image pickup assist button is released, the process proceeds to step S604. In step S604, the CPU 114 controls the lens driving motor 213 to perform zoom-in operation to a maximum focal length in which the gazing point position display frame 1411 is enclosed within the angle of view as illustrated in FIG. 7C. That is, the control unit 114b zooms in on a zoom-out image acquired by zooming out in step S602 from the second focal length to a third focal length on more telephoto side than the second focal length, based on the gazing point position estimated by the estimation unit 14a.

As described above, in this embodiment, the control unit 114b zooms out the image displayed on the display unit 113 from the first focal length to the second focal length on more wide-angle side than the first focal length. The control unit 114b zooms in on the zoom-out image from the second focal length to the third focal length on more telephoto side than the second focal length, based on the gazing point position estimated by the estimation unit 114a.

The control unit 114b may zoom in on the zoom-out image to the third focal length within a range where the gazing point position is displayed on the display unit 113. The third focal length may be set to less than or equal to the first focal length so that the angle of view after the zoom in in S604 is not narrower than the angle of view of when the image pickup assist operation starts (timing from S601 to S602). The display unit 113 may display a frame (gazing point position display frame 1411) including the gazing point position on the display unit 113. This frame is the same size as that of the angle of view frame of the first focal length. When the image pickup assist control starts, the control unit 114b may zoom out the image displayed on the display unit 113 from the first focal length to the second focal length. Thereafter, when the image pickup assist operation stops, the control unit 114b zooms in on the zoom-out image from the second focal length to the third focal length. When the control unit 114b receives an instruction to cancel the image pickup assist control based on the operation on the operation unit 115 by the user, the control unit 114b may stop the image pickup assist control.

This embodiment performs the zoom-in operation to the frame including the gazing point position of the user when the image pickup assist operation is canceled. As a result, even when the center point position changes due to an unexpected movement of the object, or when the gazing point position changes to a different object, the object to be captured can be prevented from being lost from the angle of view by zoom-in operation, and a loss of an image pickup opportunity can be prevented. In the above description, an example has been described of performing the zoom-out and zoom-in operation using the optical zoom. However, the zoom is not limited to the optical zoom as long as the zoom position is variable. That is, as long as it is possible to move from the first zoom position to the second zoom position on the wide-angle side, and further from the second zoom position to the third zoom position, the optical zoom may be used, electronic zoom may be used, or those two may be used in combination.

Second Embodiment

Figure 8:
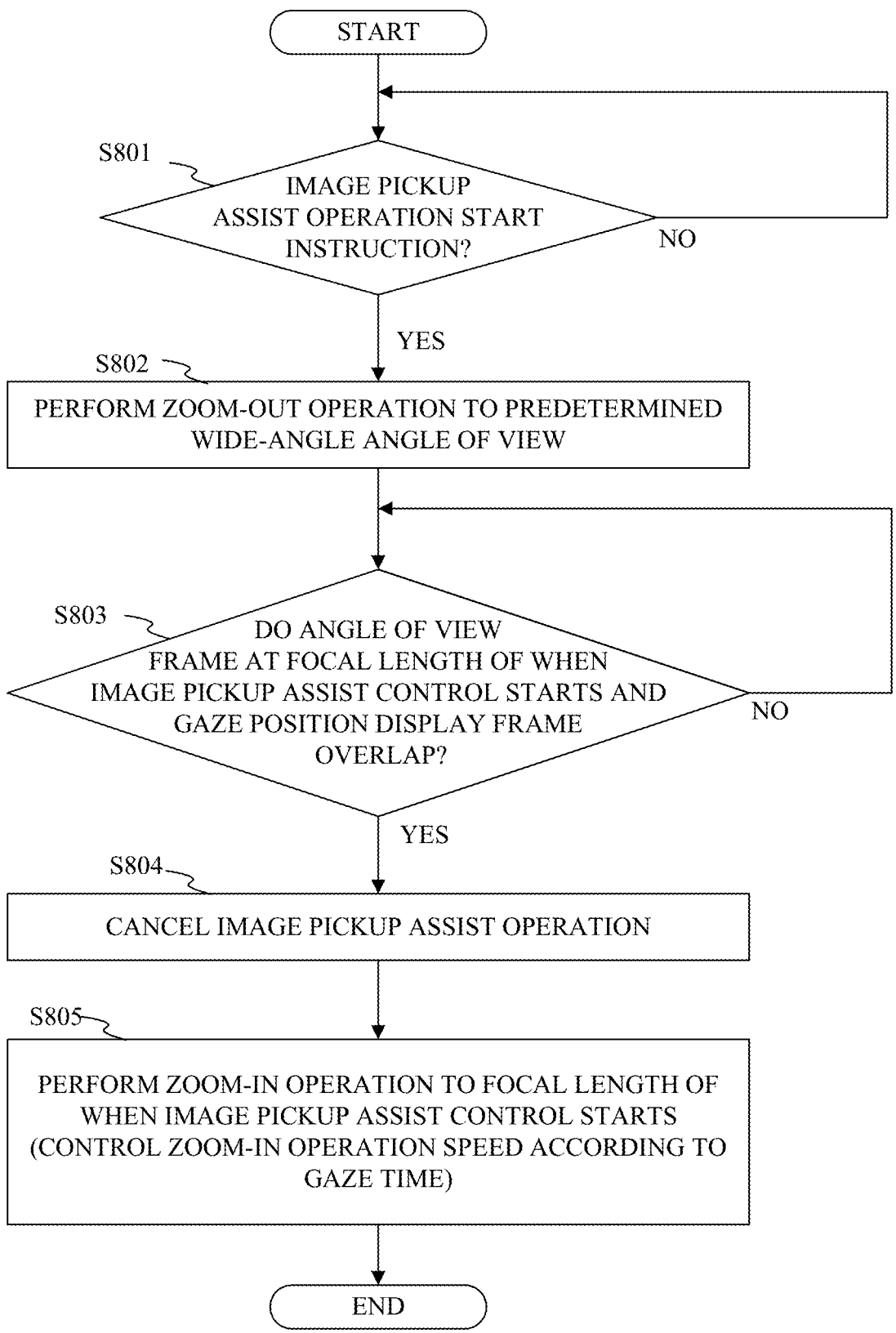
FIG. 8 is a flowchart illustrating a control method according to the second embodiment.
Figure 10C:
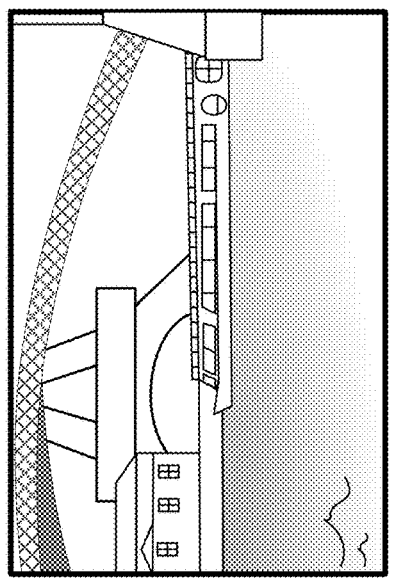
FIGS. 10A to 10C are schematic diagrams each illustrating a display screen of a display unit according to each of the second and third embodiments.
Figure 10B:
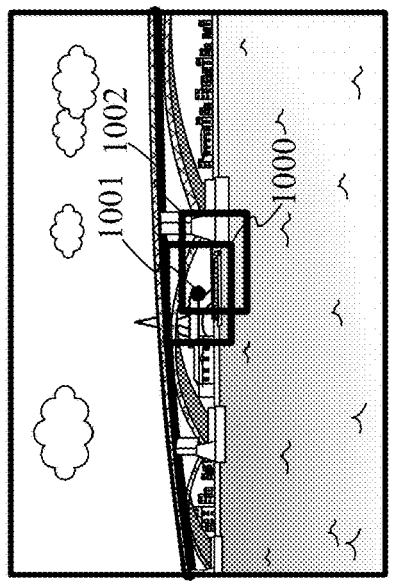
Figure 10A:
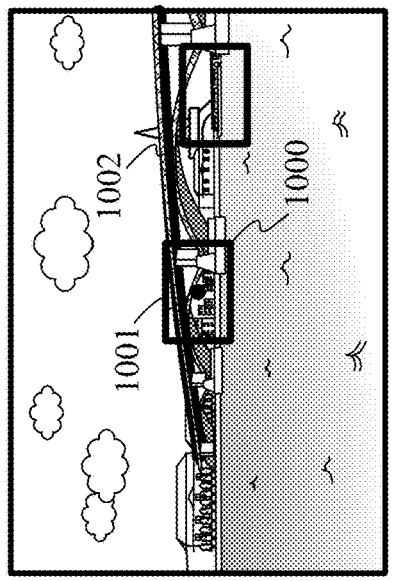

Next, a description will be given of a second embodiment of the present invention with reference to FIGS. 8 and 10A to 10C. FIG. 8 is a flowchart illustrating a control method according to this embodiment. FIGS. 10A to 10C are schematic diagrams each illustrating a display screen of the display unit 113 according to this embodiment. Configurations of a digital camera according to this embodiment are the same as those of the digital camera 100 described in the first embodiment, and thus the description thereof will be omitted.

First, in step S801, the CPU 114 determines whether or not the image pickup assist button of the operation unit 115 is pressed and the image pickup assist operation (image pickup assist control) start instruction is input. When the image pickup assist operation start instruction is not input, step S801 is repeated. On the other hand, when the image pickup assist operation start instruction is input, the process proceeds to step S802. The CPU 114 measures a gaze time on a gazing point position.

In step S802, the CPU 114 controls the lens driving motor 213 to perform zoom-out operation to a predetermined wide-angle angle of view as in the first embodiment. FIG. 10A illustrates an example of a screen displayed on the display unit 113 after the zoom-out operation. In FIG. 10A, a reference numeral 1000 denotes an angle of view frame at a focal length of when the image pickup assist control starts, a reference numeral 1001 denotes an optical center position of a lens, and a reference numeral 1002 denotes a gazing point position display frame including the gazing point position calculated by a visual line detection routine according to FIG. 5.

Subsequently, in step S803, the CPU 114 determines whether or not the angle of view frame 1000 at the focal length of when the image pickup assist control starts (at the timing of proceeding from S801 to S802) and the gazing point position display frame 1002 overlap. In this embodiment, when an area of an overlapping part of the angle of view frame 1000 and the gazing point position display frame 1002 becomes 70% or more of an area of each frame, it is determined that the frames overlap, but the present invention is not limited to this. FIG. 10B illustrates a state where the angle of view frame 1000 at the focal length of when the image pickup assist control starts overlaps with the gazing point position display frame 1002 by a user panning the digital camera 100 in a right direction without changing the gazing point position (position of the gazing point position display frame 1002). When the angle of view frame 1000 and the gazing point position display frame 1002 do not overlap in step S803, step S803 is repeated. On the other hand, when it is determined that the angle of view frame 1000 and the gazing point position display frame 1002 overlap, the process proceeds to step S804.

In step S804, the CPU 114 cancels (stops) the image pickup assist operation. That is, when the control unit 114b determines that the angle of view frame 1000 at a first focal length and the frame 1002 including the gazing point position overlap, the image pickup assist operation stops. In other words, when the CPU 114 determines that the angle of view frame 1000 at the first focal length and the frame 1002 including the gazing point position overlap, the CPU 114 determines that cancellation of the image pickup assist operation is instructed. As the condition for canceling the image pickup assist operation, in addition to the determination that the angle of view frame 1000 at the focal length of when the image pickup assist control starts and the gazing point position display frame 1002 overlap, release of the pressing on the image pickup assist button of the operation unit 115 may be used as a determination condition. When this determination condition is added, it is possible to determine image pickup assist operation release timing closer to that intended by the user.

Subsequently, in step S805, the CPU 114 controls the lens driving motor 213 to perform zoom-in operation to the focal length (first focal length) of when the image pickup assist control starts, as illustrated in FIG. 10C. Further, the CPU 114 may control to increase a driving speed of the lens driving motor 213 according to a measured length of the gaze time, so as to increase a zoom-in speed after the image pickup assist operation is cancelled. That is, the control unit 114b may change the speed of zooming in from the second focal length to the first focal length, based on the gaze time on the gazing point position. With the control on the zoom-in speed, when the user clearly identifies the object to be targeted in image pickup and the user concentrates, the gaze time becomes longer, and the user can quickly zoom in on the object that is the target of the image pickup. On the other hand, when the visual line moves to surrounding objects and the gaze time becomes short because the target object for the image pickup is not determined, the speed becomes slow of zooming in to the focal length of when the image pickup assist control starts, thereby the surrounding objects can be observed for a longer period of time, and thus it is possible to quickly respond to an unexpected object change. When the gazing point position changes while zooming in to the focal length of when the image pickup assist control start, the zooming in may be stopped at that point. Instead of zooming in to the first focal length in S805, zooming in may be performed to a focal length corresponding to an angle of view including both the angle of view frame 1000 and the gazing point position display frame 1002.

This embodiment can quickly determine the cancellation timing of the image pickup assist when the angle of view frame 1000 at the focal length of when the image pickup assist control starts and the gazing point position display frame 1002 overlap, and thereby can prevent a loss of an image pickup opportunity.

Third Embodiment

Figure 9:
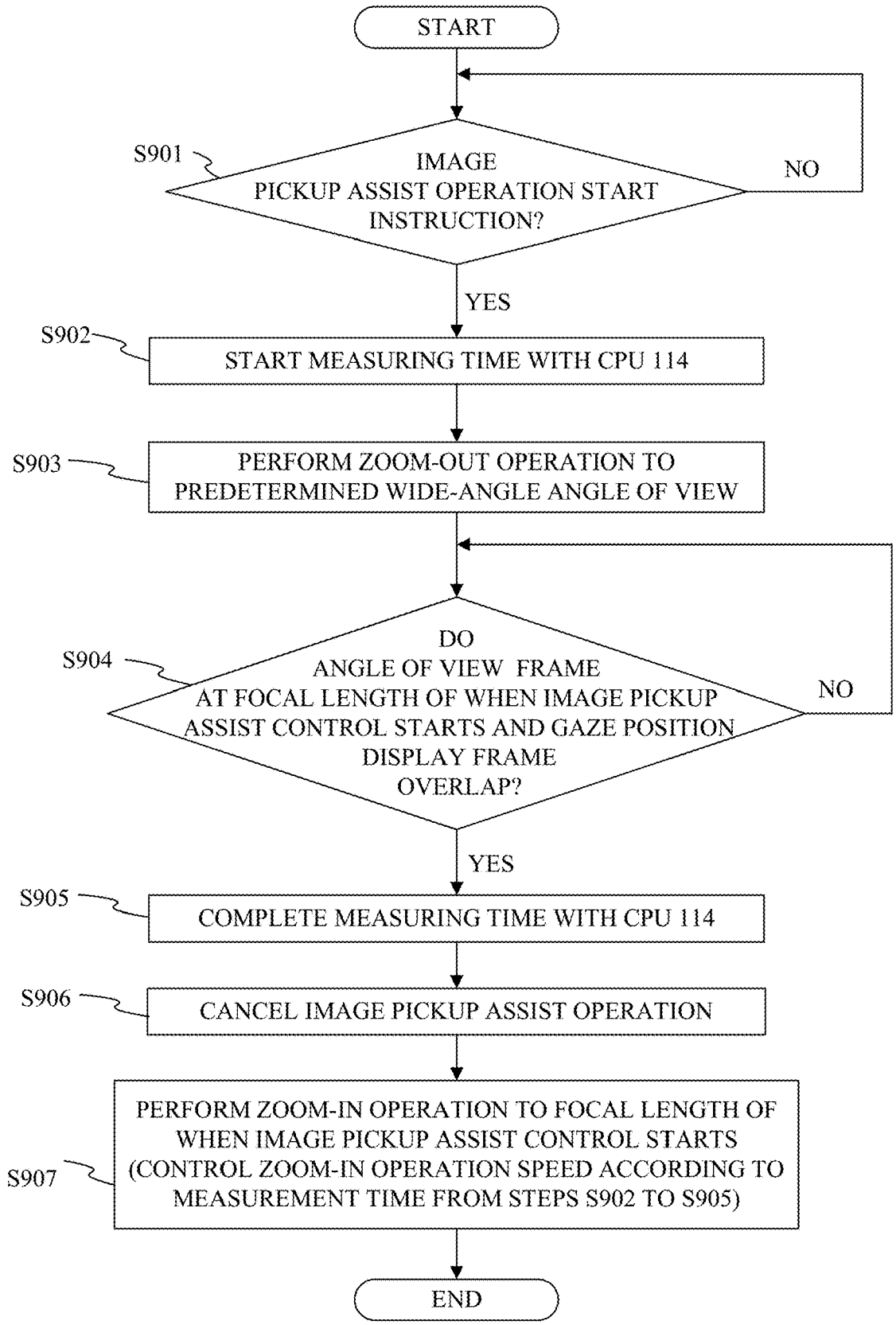
FIG. 9 is a flowchart illustrating a control method according to the third embodiment.

Next, a description will be given of a third embodiment of the present invention with reference to FIGS. 9 and 10A to 10C. FIG. 9 is a flowchart illustrating a control method according to this embodiment. Each of FIGS. 10A to 10C is a schematic diagram illustrating a display screen of the display unit 113 according to this embodiment. Configurations of a digital camera according to this embodiment is the same as those of the digital camera 100 described in the first embodiment, and thus the description thereof will be omitted. The flowchart of FIG. 9 includes the same processing as that in the flowchart of FIG. 8 described in the second embodiment, and thus a description of the same processing will be omitted.

Step S901 is the same as step S801 in FIG. 8. After start of image pickup assist operation is determined in step S901, the process proceeds to step S902. In step S902, the CPU 114 starts measuring a time it takes for an angle of view frame 1000 at a focal length of when the image pickup assist control starts and a gazing point position display frame 1002 to overlap.

Subsequent steps S903 and S904 are the same as steps S802 and S803 in FIG. 8, respectively. When it is determined in step S904 that the angle of view frame 1000 at the focal length of when the image pickup assist control starts and the gazing point position display frame 1002 overlap, the process proceeds to step S905. In step S905, the CPU 114 completes the time measurement started in step S902. Subsequent step S906 is the same as step S804 of FIG. 8.

Subsequently, in step S907, the CPU 114 controls the lens driving motor 213 and performs zoom-in operation to the focal length of when the image pickup assist control starts as illustrated in FIG. 10C. The CPU 114 changes a driving speed of a lens driving motor 213 according to a length of a measurement time it takes for the angle of view frame 1000 at the focal length (first focal length) of when the image pickup assist control starts and the gazing point position display frame 1002 to overlap, and changes a zoom-in speed after canceling the image pickup assist operation. That is, when the measurement time is short, the zoom-in speed is increased, and when the measurement time is long, the zoom-in speed is decreased.

As described above, in this embodiment, the control unit 114b stops the image pickup assist control when the gaze time on the gazing point position exceeds a predetermined time. The control unit 114b may change a zoom-in speed from a second focal length to a third focal length, based on a time it takes for a distance between the angle of view frame 1000 of the first focal length and the gazing point position display frame 1002 to become smaller than a predetermined distance.

According to this embodiment, when a user clearly identifies an object to be targeted in image pickup and quickly points the digital camera 100, it is possible to quickly zoom in on the object to be targeted in the image pickup. On the other hand, when the object to be targeted in the image pickup is not determined and the digital camera 100 is slowly pointed, the speed becomes slow of zooming in to the focal length of when the image pickup assist control starts, and it is possible to observe the surrounding objects for a longer time. As a result, it is possible to quickly respond to an unexpected object change and to prevent a loss of an image pickup opportunity.

Fourth Embodiment

Next, a description will be given of an image pickup apparatus (image processing apparatus) according to a fourth embodiment of the present invention. The image pickup apparatus according to this embodiment includes a sub-image pickup unit configured to capture a wide-angle image for assisting framing, in addition to a main image pickup unit for recording. Part of configurations and a holding image pickup area display processing of the image pickup apparatus according to this embodiment are the same as those of the first embodiment, thus only different part will be described, and the description of the same part will be omitted.

Figure 11:
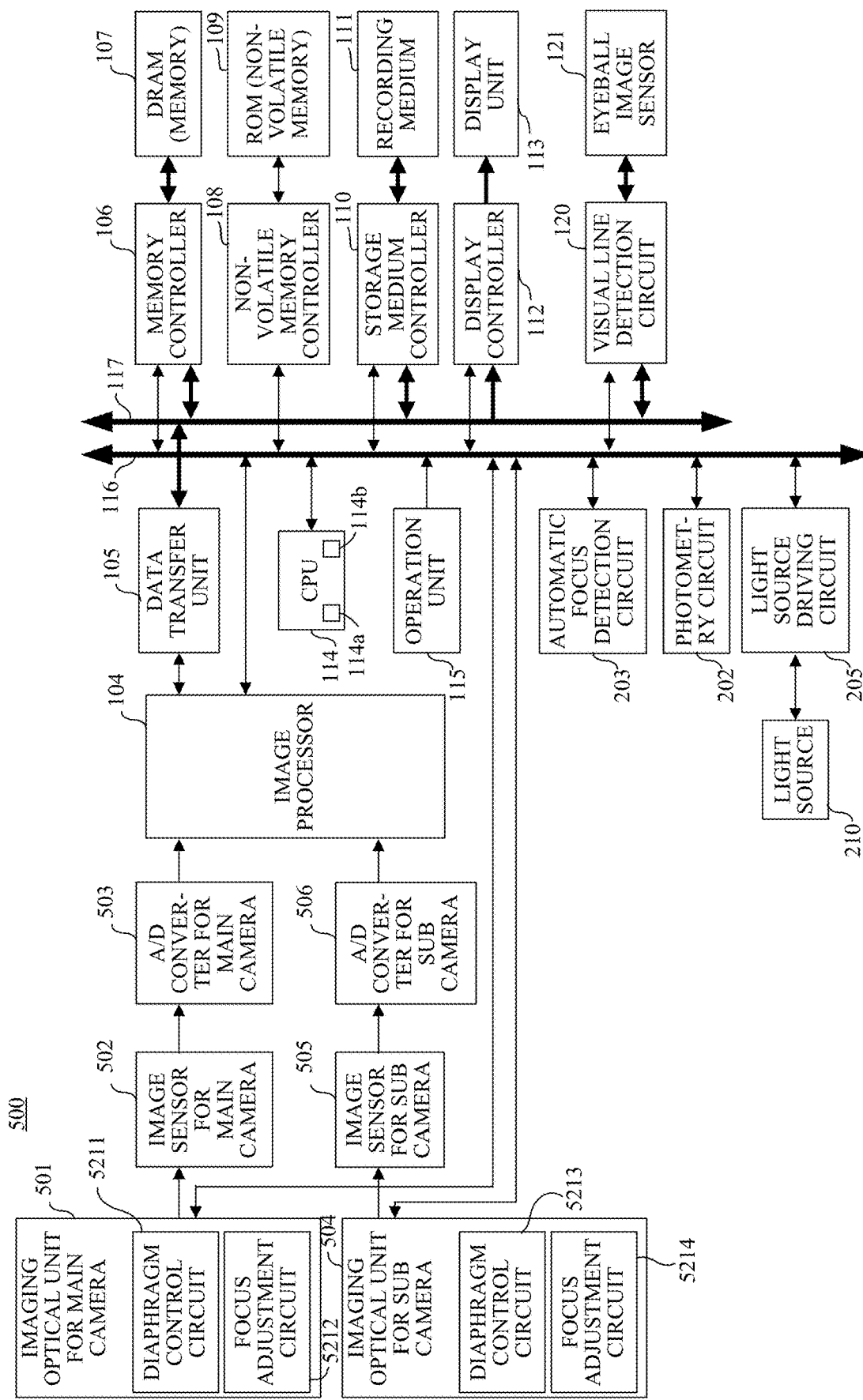

FIG. 11 is a block diagram illustrating a digital camera 500 as the image pickup apparatus according to this embodiment. The same elements as those in the first embodiment are designated by the same reference numerals, and detailed description thereof will be omitted. In FIG. 11, an imaging optical unit 501 for a main camera, which mainly performs telephoto image pickup, includes a plurality of lens units including a focus lens and an image stabilization lens, and a diaphragm. At a time of image pickup, the imaging optical unit 501 for the main camera performs focus adjustment with a focus adjustment circuit 5212, exposure adjustment with a diaphragm control circuit 5211, image stabilization, and the like, and forms an optical image on an image sensor 502 for the main camera. The image sensor 502 for the main camera has a photoelectric conversion function for converting an optical image into an electric signal, that is an analog image signal, and includes a CCD sensor, a CMOS sensor, or the like. An A/D converter 503 for the main camera is configured to convert the analog image signal from the image sensor 502 for the main camera into a digital image signal. Converted image data is input to an image processor 104 in a subsequent stage.

The digital camera 500 includes an imaging optical unit 504 for a sub camera, an image sensor 505 for the sub camera, and an A/D converter 506 for the sub camera, which have same functions as above, respectively, for a purpose of performing wide-angle image pickup. Converted image data is input to the image processor 104 in a subsequent stage. The imaging optical unit 504 for the sub camera includes a focus adjustment circuit 5214 and a diaphragm control circuit 5213, as with the imaging optical unit 501 for the main camera. In this embodiment, elements for the subsequent stage of that in the image processor 104 are the same as those in the first embodiment described with reference to FIG. 1.

Figure 12:
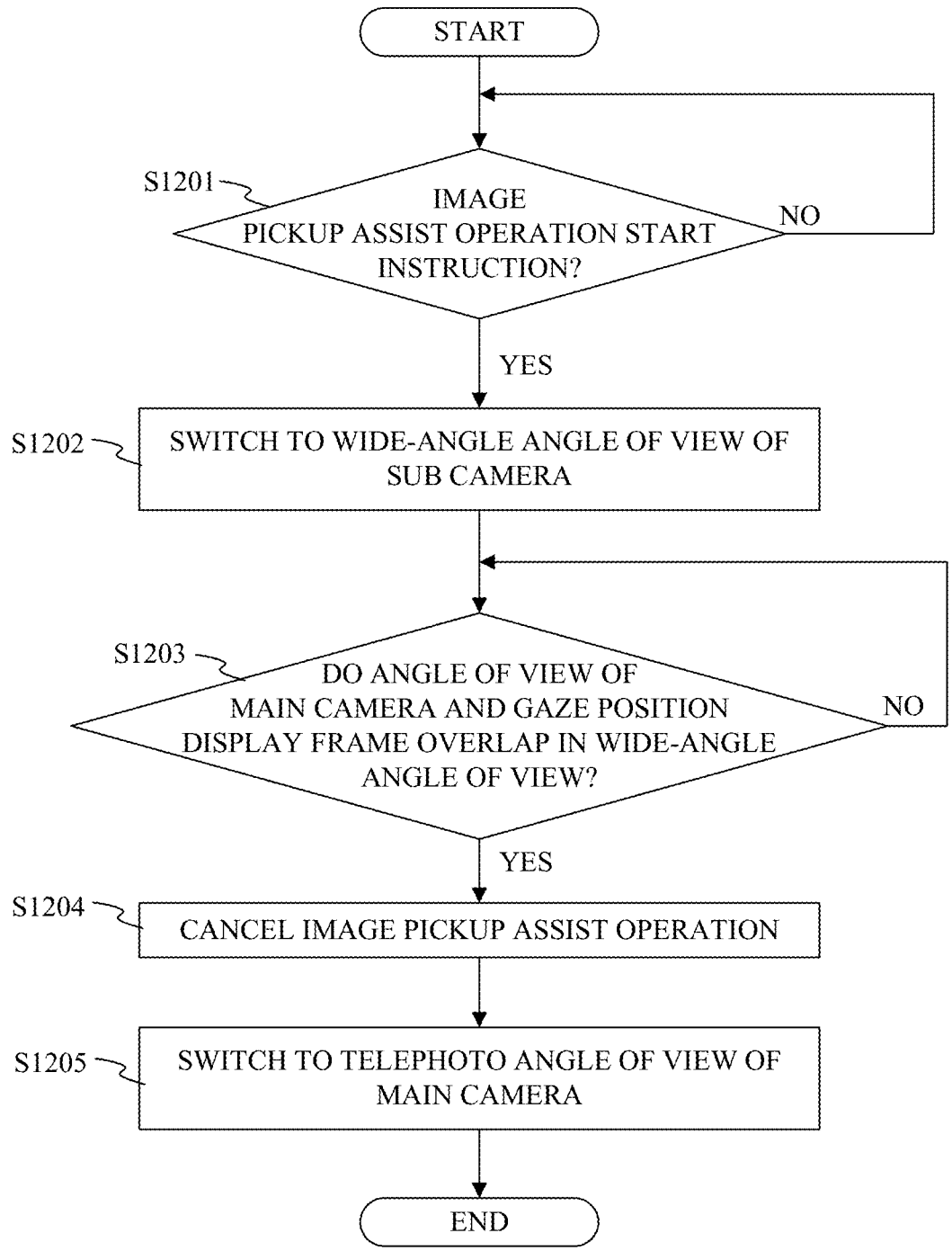
FIG. 12 is a flowchart illustrating a control method according to the fourth embodiment.
Figure 13C:
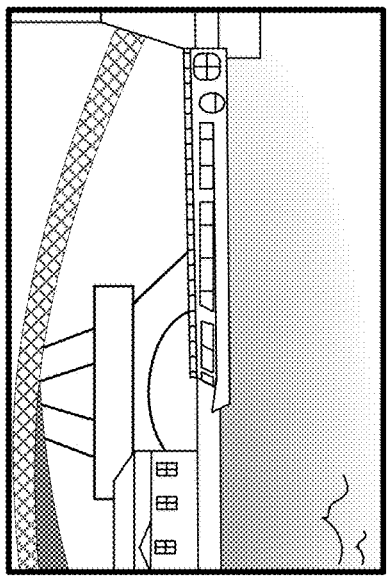
FIGS. 13A to 13C are schematic diagrams each illustrating a display screen of a display unit according to the fourth embodiment.
Figure 13B:
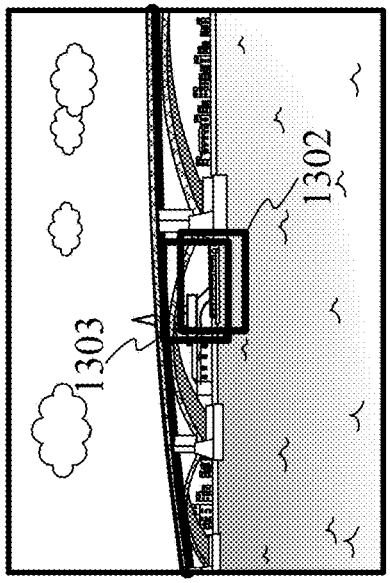

Next, a control method will be described according to this embodiment with reference to FIG. 12 and FIGS. 13A to 13C. FIG. 12 is a flowchart illustrating the control method according to this embodiment. Each of FIGS. 13A to 13C is a schematic diagram illustrating a display screen of the display unit 113 according to this embodiment.

First, in step S1201, the CPU 114 determines whether or not the image pickup assist button of the operation unit 115 is pressed and image pickup assist operation (image pickup assist control) start instruction is input. When the image pickup assist operation start instruction is not input, step S1201 is repeated. On the other hand, when the image pickup assist operation start instruction is instructed, the process proceeds to step S1202.

Figure 13A:
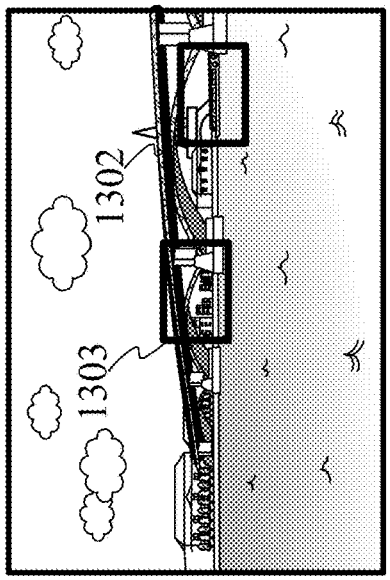

In step S1202, the CPU 114 switches the display screen of the display unit 113 to an image pickup image (wide-angle image) from the sub camera which can perform image pickup on more wide-angle side than the main camera, as illustrated in FIG. 13A. In FIG. 13A, a reference numeral 1303 denotes an image pickup angle of view of the main camera, and a reference numeral 1302 denotes a gazing point position display frame including a gazing point position calculated by a visual line detection routine illustrated in FIG. 5.

Subsequently, in step S203, the CPU 114 determines whether or not the image pickup angle of view 1303 of the main camera and the gazing point position display frame 1302 overlap. In this embodiment, when an area of an overlapping part of the image pickup angle of view 1303 of the main camera and the gazing point position display frame 1302 becomes 70% or more of an area of each frame, it is determined that the image pickup angle of view 1303 of the main camera and the gazing point position display frame 1302 overlap, but the present invention is not limited to this. In FIG. 13B, a state is illustrated where the image pickup angle of view 1303 of the main camera and the gazing point position display frame 1302 overlap each other by a user panning the digital camera 100 to a right direction without changing the gazing point position (position of the gazing point position display frame 1302). When the image pickup angle of view 1303 of the main camera and the gazing point position display frame 1302 do not overlap in step S1203, step S1203 is repeated. On the other hand, when the image pickup angle of view 1303 of the main camera and the gazing point position display frame 1302 overlap in step S1203, the process proceeds to step S1204.

In step S1204, the CPU 114 cancels (stops) the image pickup assist operation. As a cancellation condition of the image pickup assist operation, in addition to the determination that the image pickup angle of view 1303 of the main camera and the gazing point position display frame 1002 overlap, a determination condition may be used that the image pickup assist button of the operation unit 115 is released. When this determination condition is added, it is possible to determine the image pickup assist operation cancel timing closer to that intended by the user. Subsequently, in step S1205, the CPU 114 switches the display screen of the display unit 113 to an image pickup image (telephoto angle of view) of the main camera on more telephoto side than the sub camera as illustrated in FIG. 13C.

As described above, in this embodiment, the image pickup apparatus 500 includes a first image sensor (image sensor 502 for the main camera) and a second image sensor (image sensor 505 for the sub camera). The first image sensor acquires a first image by photoelectric conversion of an optical image formed via a first optical system (imaging optical unit 501 for the main camera). The second image sensor acquires a second image of a wider angle than the first image by photoelectric conversion of an optical image formed via a second optical system (imaging optical unit 504 for the sub camera). The control unit 114b displays a second image on the display unit 113. The control unit 114b determines whether or not the angle of view frame (image pickup angle of view 1303 of the main camera) of the first image displayed superimposed on the second image and a frame including the gazing point position (gazing point position display frame 1302) of the second image overlap. When the angle of view frame of the first image and the frame including the gazing point position overlap, the control unit 114b switches from the second image displayed on the display unit 113 to the first image.

According to this embodiment, it is possible to quickly determine the cancellation timing of the image pickup assist at a timing when the image pickup angle of view 1303 of the main camera and the gazing point position display frame 1002 overlap, and to prevent a loss of an image pickup opportunity.

Fifth Embodiment

Figure 14A:
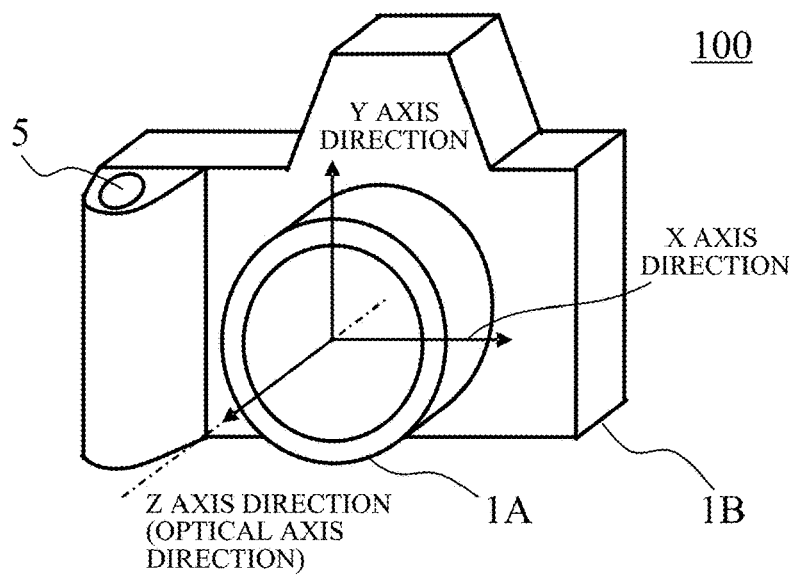
FIGS. 14A to 14C are external schematic diagrams each illustrating an image pickup apparatus according to a fifth embodiment.
Figure 14B:
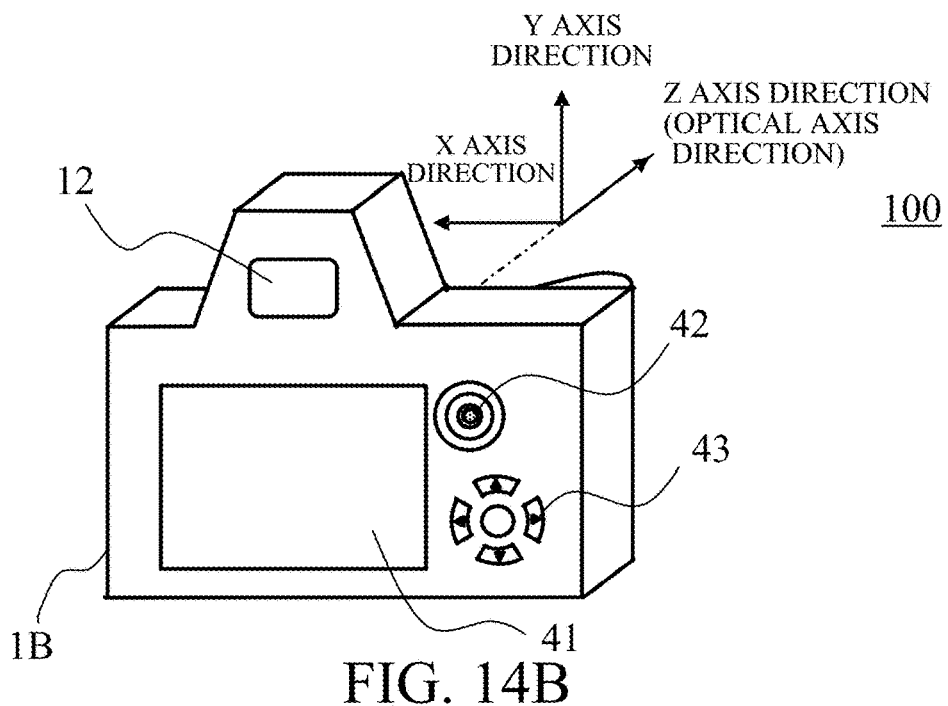
Figure 14C:
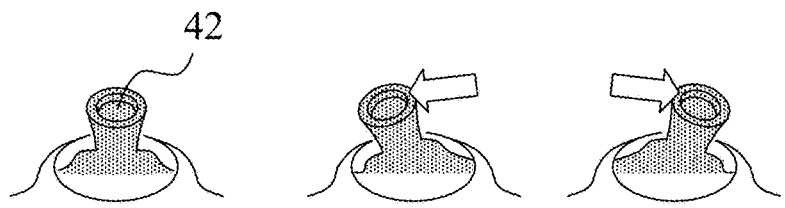

Next, a description will be given of the fifth embodiment of the present invention with reference to FIGS. 14A to 19. In the first embodiment, a description has been given of a case where start and stop of the image pickup assist are performed by the user operating the operation unit (pressing/releasing the image pickup assist button). In each of the second embodiment to the fourth embodiment, a description has been given of a case where the start instruction for the image pickup assist is performed by the user operating the operation unit (pressing the image pickup assist button) and the stop instruction is performed based on the detection result of the gazing point position. In this embodiment, a description will be given of a case where each of start and stop instructions for image pickup assist are performed based on a detection result of a gazing point position. FIGS. 14A to 14C are external schematic diagrams each illustrating a digital camera 100 as an image pickup apparatus according to this embodiment. FIG. 14A is a front perspective view of the digital camera 100, and FIG. 14B is a rear perspective view. In this embodiment, the digital camera 100 is configured to include an image pickup lens 1A as a lens apparatus and a camera body frame 1B as a camera main body, as illustrated in FIG. 14A. On the camera body frame 1B, a release button 5 is disposed which forms a part of an operation unit 115 configured to receive image pickup operation from a user. As illustrated in FIG. 14B, on a back surface of the digital camera 100, an eyepiece lens 12 is disposed for the user to look into a display unit 113. The digital camera 100 includes an operation member α (touch panel compatible liquid crystal 41), an operation member β (lever type operation member 42), and an operation member γ (button-type cross key 43) each of which is used for camera operation described later as a part of the operation unit 115. The operation members α, β, and γ are used, for example, in a case of movement control by manual operation for an estimated gazing point frame position described later. FIG. 1 corresponds to a sectional view obtained by cutting the digital camera 100 in a YZ plane formed by a Y axis and a Z axis in FIG. 14A. In FIG. 1 and FIGS. 14A to 14C, corresponding portions are represented by same reference numerals.

Figure 15:
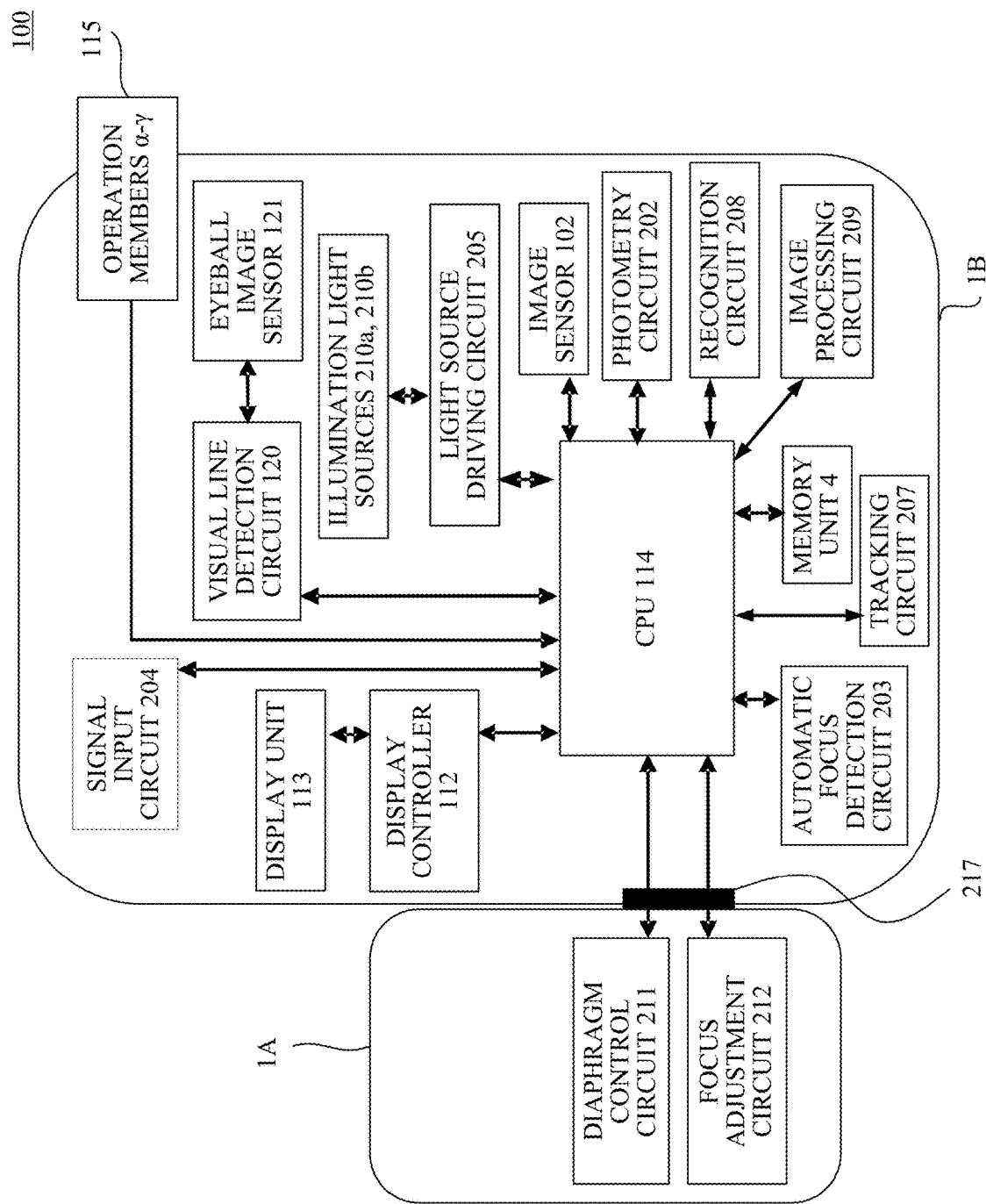
FIG. 15 is a block diagram illustrating an electrical configuration of the image pickup apparatus according to the fifth embodiment.

FIG. 15 is a block diagram illustrating an electrical configuration of the digital camera 100. In FIG. 15, same elements as those in FIG. 1 are represented by same reference numerals. A CPU 114 is connected to a visual line detection circuit 120, a photometry circuit 202, an automatic focus detection circuit 203, a signal input circuit 204, a display controller 112, a light source driving circuit 205, a tracking circuit 207, a recognition circuit 208, and an image processing circuit 209. Via a mount contact 217, the CPU 114 communicates signals with each of a focus adjustment circuit 212 and a diaphragm control circuit 211 each of which is disposed on an image pickup lens 1A. A memory unit 4 attached to the CPU 114 has a function for storing image pickup signals from an image sensor 102 and from an eyeball image sensor 121, and a function for storing visual line correction data for correcting individual differences in a visual line described later.

The visual line detection circuit 120 is configured to A/D-convert output acquired by imaging an eyeball image on the eyeball image sensor 121 (CCD-EYE), and to transmit information on this image to the CPU 114. The CPU 114 is configured to extract each feature point of the eyeball image required for visual line detection, according to a predetermined algorithm described later, and to calculate a user's visual line from a position of each feature point. The photometry circuit 202 is configured to amplify luminance signal output corresponding to brightness of a field of view, based on a signal obtained from the image sensor 102 that also serves as a photometric sensor, thereafter to perform logarithmic compression and A/D conversion to obtain field of view luminance information, and to transmit it to the CPU 114.

The automatic focus detection circuit 203 is configured to A/D-convert signal voltages from a plurality of pixels which are used for phase difference detection and which are included in a CCD of the image sensor 102, and to transmit the signals to the CPU 114. The CPU 114 is configured to calculate a distance to an object corresponding to each focus detection point, from the signals of the plurality of pixels. This is a known technique known as image pickup surface phase-difference AF. In this embodiment, as an example, it is assumed that there are 180 focus detection points at positions on an image pickup surface, the positions corresponding to locations illustrated in an in-viewfinder field image of FIG. 16A to 16C.

The tracking circuit 207 is a circuit that inputs an image and tracks an object under the control of the CPU 114, and is configured to transmit information on a tracking frame of image information to the CPU 114. In tracking processing, for example, SAD (Sum of Absolute Difference) is used to acquire a similarity between two images and to perform tracking. The tracking circuit 207 may use tracking processing other than SAD. The recognition circuit 208 is a circuit that recognizes an object for an input image, and performs, for example, face detection of a person or detection of an animal. The image processing circuit 209 includes various image processors, buffer memories, and the like for the input image, and is configured to properly performing, on image data, lateral chromatic aberration correction, development processing, noise reduction processing, geometric deformation, resize processing such as enlargement/reduction, and the like. The image processing circuit 209 includes a correction unit and the like configured to properly perform, on the image data, pixel correction, black level correction, shading correction, defective pixel correction, and the like.

The signal input circuit 204 is connected to a switch SW1 which is turned on by a first stroke on the release button 5 and which is for starting photometry, distance measurement, visual line detection operation, and the like of the camera, and to a switch SW2 which is turned on by a second stroke on the release button 5, and which is for starting release operation. The signal is input to the signal input circuit 204 and transmitted to the CPU 114. The operation member α (touch panel compatible liquid crystal 41), the operation member β (lever type operation member 42), and the operation member γ (button type cross key 43) are configured so that the operation signal is transmitted to the CPU 114 and accordingly movement operation control and the like are performed on an estimated gazing point frame position, which will be described later.

Figure 16A:
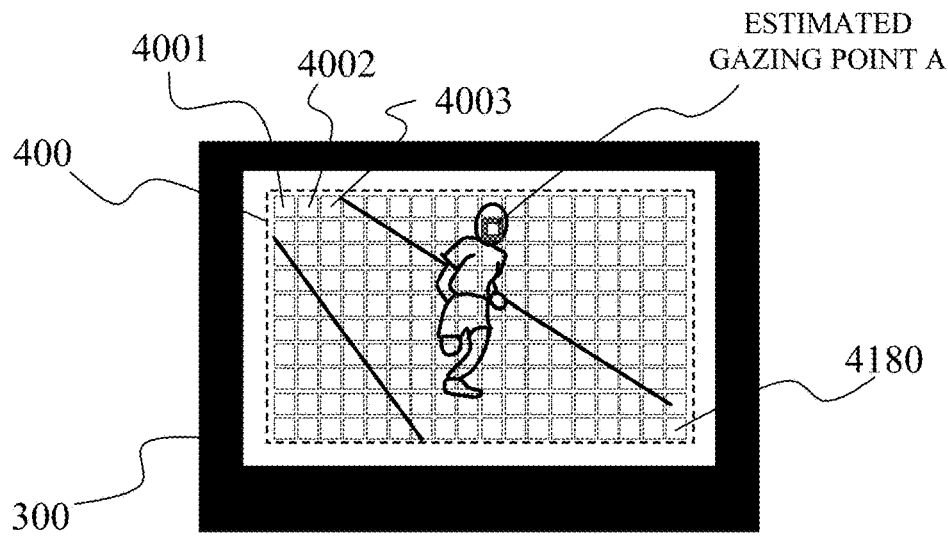
FIGS. 16A to 16C are exploratory diagrams each illustrating an in-viewfinder field according to the fifth embodiment.
Figure 16B:
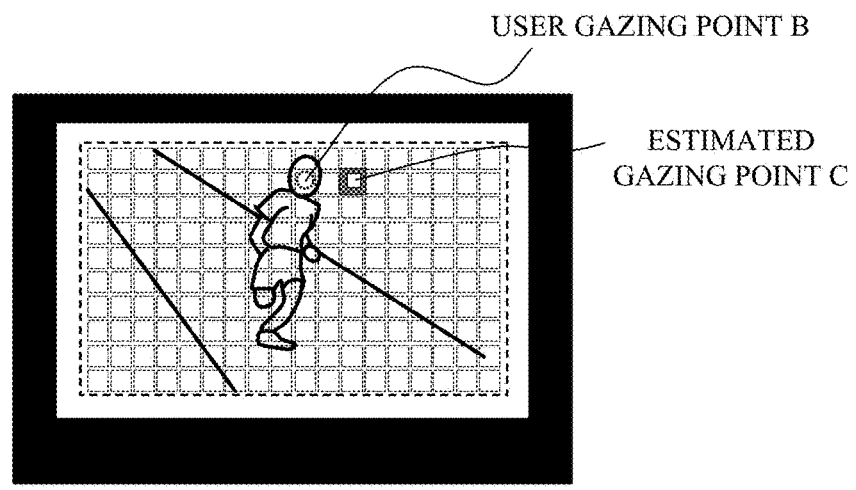
Figure 16C:
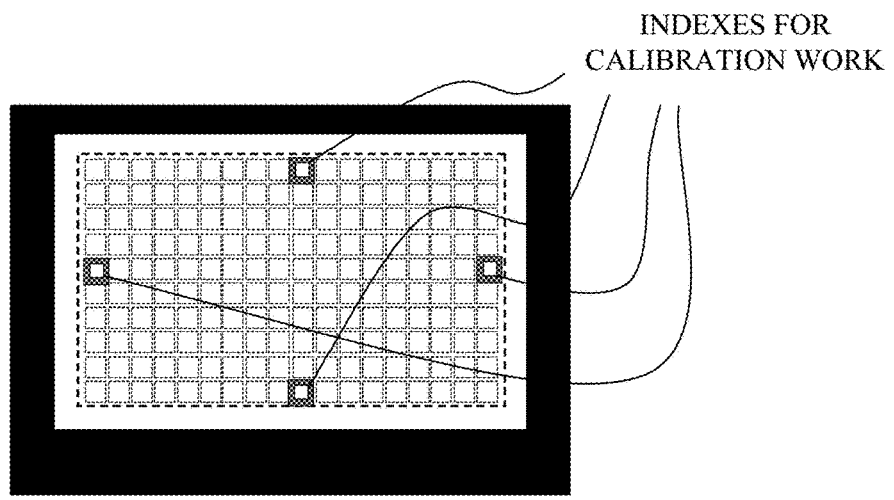

FIGS. 16A to 16C are exploratory diagrams each illustrating a field of view of a finder, and each illustrating a state in which the display unit 113 is operated. In FIGS. 16A to 16C, a reference numeral 300 denotes a field mask, a reference numeral 400 denotes a focus detection area, and reference numerals 4001 to 4180 denote 180 visual targets of distance measurement points displayed on a through image displayed on the display unit 113 at positions corresponding to a plurality of focus detection points on an image pickup surface. Among those indexes, an index is displayed with a frame as with an estimated gazing point A illustrated in the drawing, the index corresponding to a current estimated gazing point position. A visual line detection method according to this embodiment is as described with reference to FIGS. 3 to 5 in the first embodiment.

The calibration work will be described with reference to FIGS. 16A to 16C. As described above, the gazing point position is estimated by acquiring rotational angles θx and θy of an eyeball from an eyeball image in visual line detection routine and by performing coordinate conversion on a pupil center position to a corresponding position on the display unit 113.

However, if values of visual line correction coefficients Ax, Ay, Bx, and By are not adjusted to proper values by the user, a difference is caused between a position B which the user actually gazes at and a calculated estimated gazing point C, as illustrated in FIG. 16B, by factors such as individual differences in a shape of a human eyeball. In the above example, although the user wants to gaze at the person at a position B, the camera mistakenly estimates that the background is gazed at, and proper focus detection and adjustment cannot be performed. Therefore, it is necessary to perform calibration work, to acquire a proper correction coefficient value for the user, and to store it in the camera before image pickup with the camera.

Conventionally, calibration work is performed by highlighting a plurality of indexes at different positions as illustrated in FIG. 16C on a viewfinder field of view before image pickup and having a user look at the indexes. It is known as a known technique to perform a gazing point detection flow when the user gazes at each visual target and to acquire a proper value of a coefficient from a plurality of calculated estimated gazing point coordinates and the position of each visual target coordinates.

Next, image pickup assist processing will be described with reference to FIGS. 17A to 17D and FIGS. 18A and 18B.

FIGS. 17A to 17D are diagrams illustrating changes in display angle of views according to this embodiment, and illustrate a case where the display angle of view is automatically zoomed out and zoomed in at the time of image pickup (when image pickup assist is performed). FIGS. 18A and 18B are flowcharts illustrating image pickup assist processing. Each step of FIGS. 18A and 18B is mainly executed by the CPU 114.

Figure 17A:
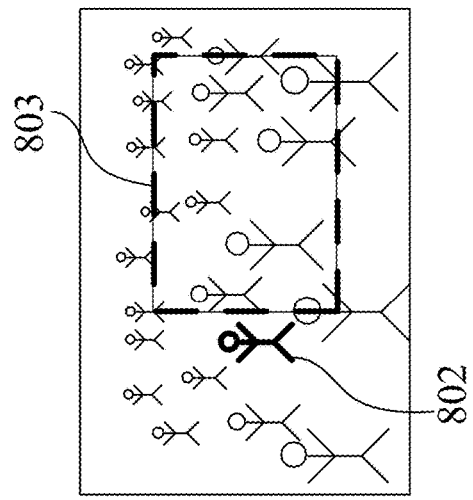
FIGS. 17A to 17D are diagrams illustrating changes in a display angle of view according to the fifth embodiment.
Figure 17B:
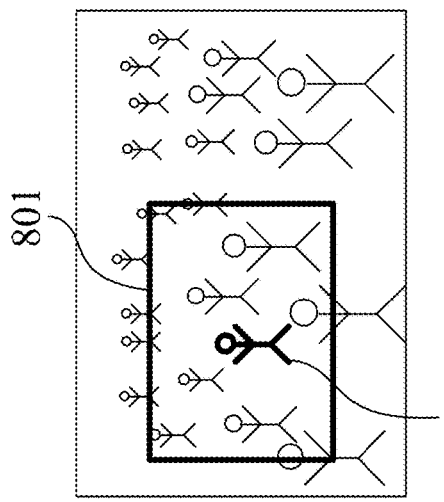
Figure 17C:
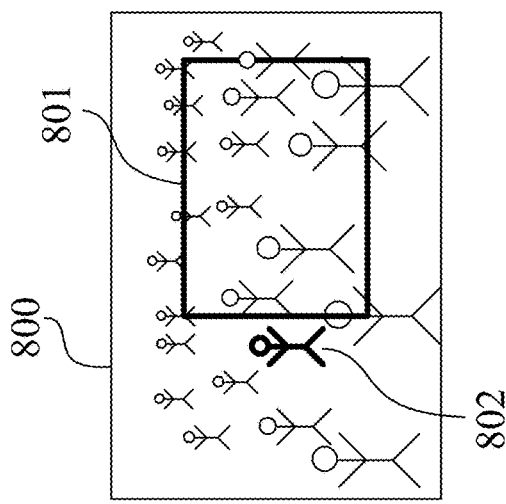
Figure 17D:
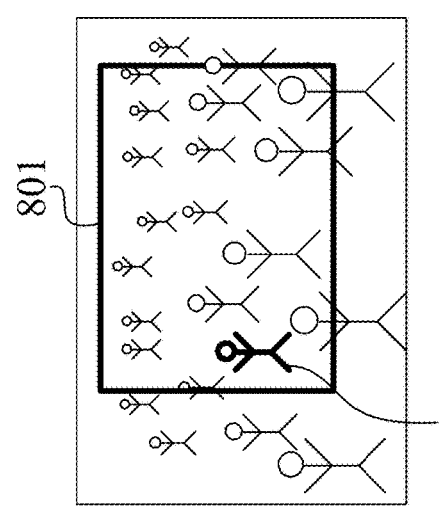
Figure 18A:
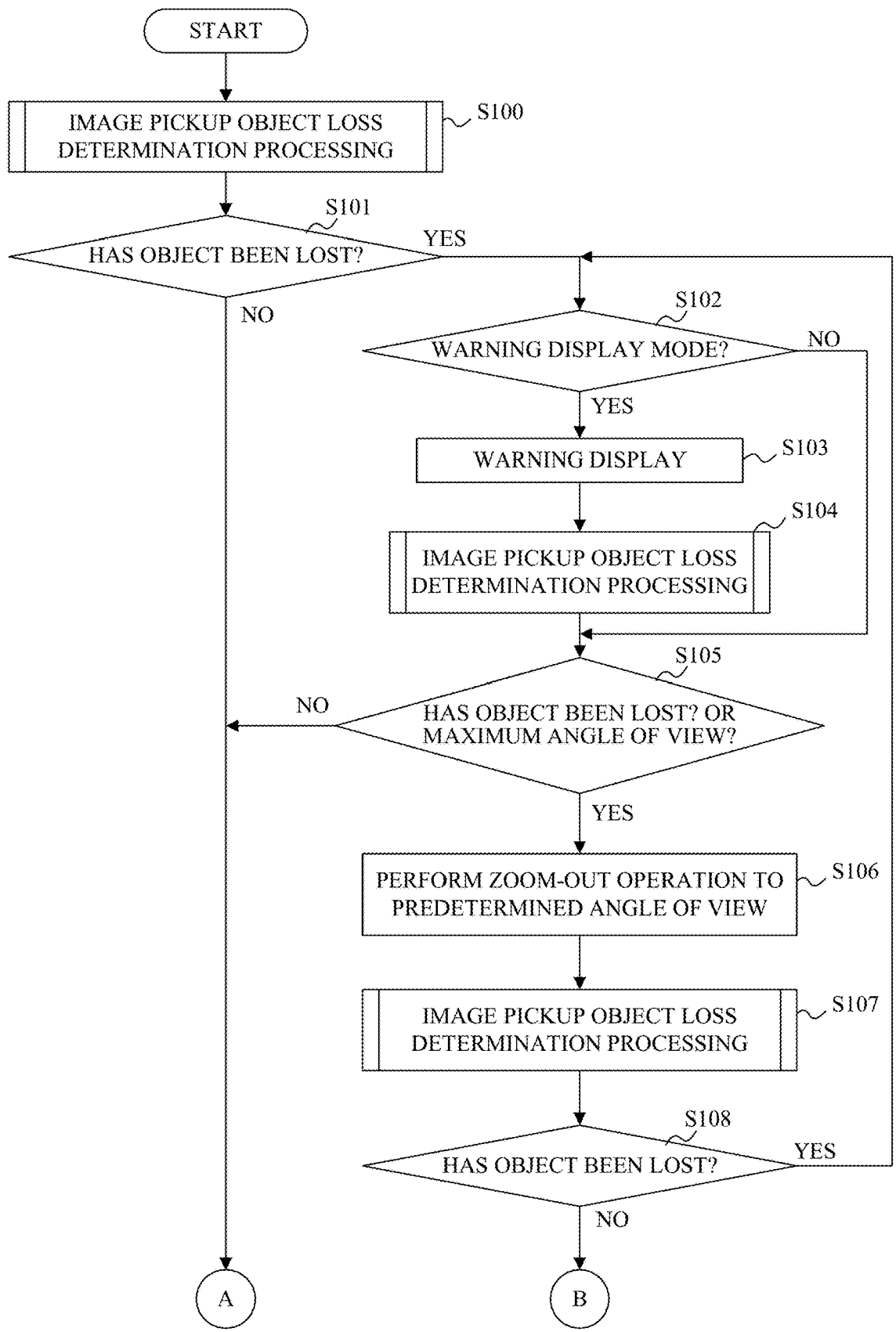
FIGS. 18A and 18B are flowcharts each illustrating image pickup assist processing according to the fifth embodiment.
Figure 18B:
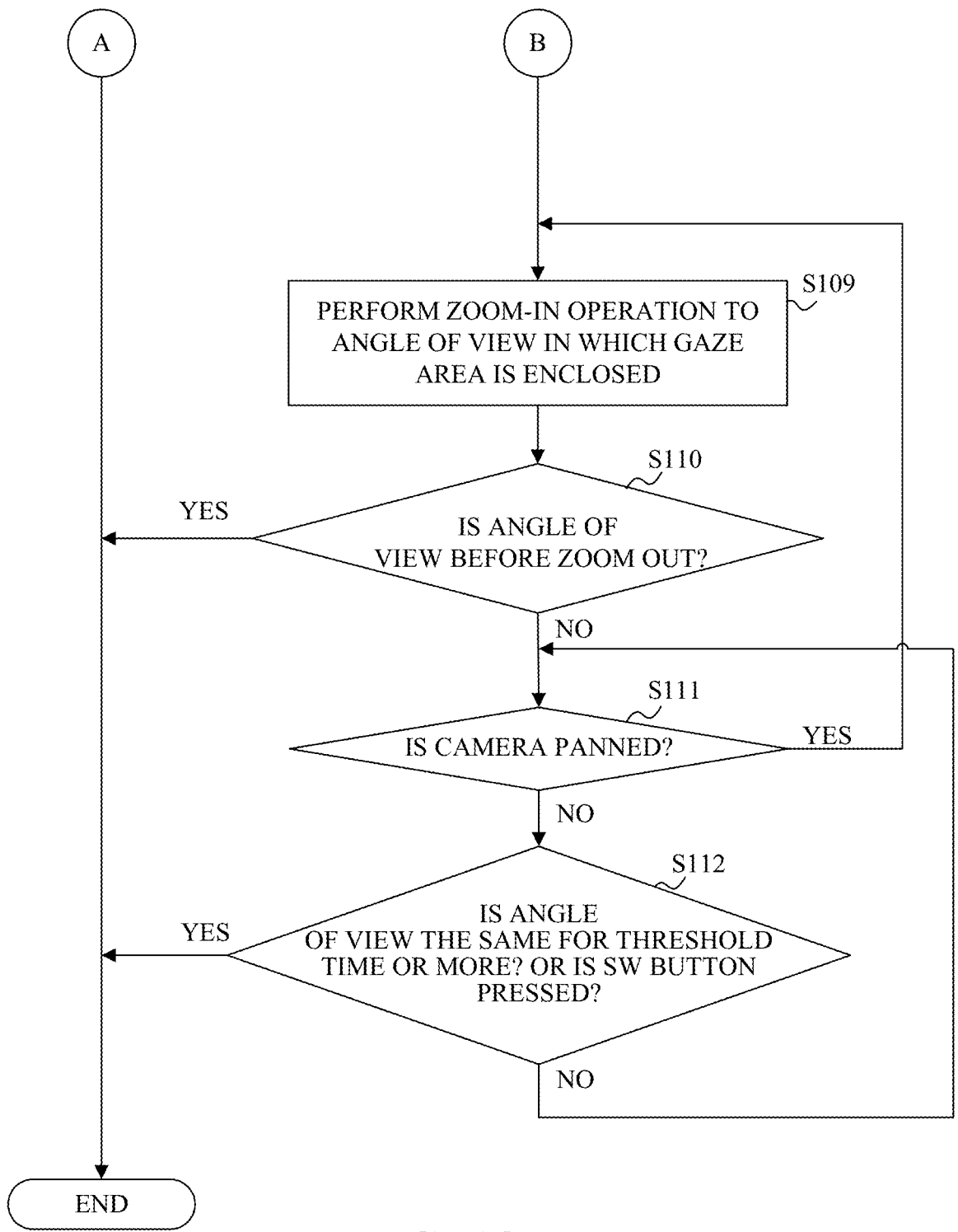

A reference numeral 800 in FIG. 17A denotes an image captured by the image sensor 102 in a case of electronic zooming, and schematically denotes an image pickup scene outside an angle of view captured by the image sensor 102 in a case of optical zoom. A reference numeral 801 denotes a display image displayed on the display unit 113. A reference numeral 802 denotes an object that the user wants to capture. A dotted line frame of 803 in FIG. 17B indicates a warning display, and is indicated by the frame of the image displayed on the display unit 113 blinking in red, for example. FIG. 17A is an example of image pickup of play in a sports day, and illustrates a state in which an image pickup object 802 is out of the display of the display unit 113 due to camera shake. FIG. 17B illustrates a state in which an outmost angle of display is blinking on the display for notifying the user in advance of that the display angle of view is to be changed to the wide-angle side, because it is detected that the image pickup object 802 has been lost in image pickup assist processing flow described later. FIG. 17C illustrates a state in which the display angle of view is widened after the warning display of FIG. 17B. In FIG. 17C, the image pickup object 802 is found. It is assumed that the angle of view is gradually expanded until the image pickup object 802 is found. FIG. 17D illustrates a state in which the user thereafter returns the angle of view to the angle of view of FIG. 17A by returning the image pickup object 802 to a center position of the display unit 113.

Next, a specific description will be given of image pickup assist processing with reference to FIGS. 18A and 18B. In this embodiment, the zoom operation is described as optical zooming, but the zoom operation is not limited to this. When the zoom operation is performed by electronic zooming, the same operation is performed by cropping the image and changing the angle of view with the image processing circuit 209. This point is the same in the first to fourth embodiments described above.

When the image pickup assist processing starts, the CPU 114 performs image pickup object loss determination processing in step S100. The image pickup object loss determination processing will be described later with reference to FIG. 19. By performing this processing, it is determined whether or not the object has been lost. Subsequently, in step S101, the CPU 114 determines whether or not the user has lost sight of the object, based on a result of the image pickup object loss determination processing. When it is determined that the user has lost the sight of the object, the process proceeds to step S102. On the other hand, when it is determined that the user has not lost the sight of the object, that is when the user is capturing the image pickup object, the process ends without doing anything.

Subsequently, in step S102, the CPU 114 determines whether a warning display mode is set, that is, whether or not it is set in advance in the camera menu that the warning display is performed when the angle of view is automatically changed by the image pickup assist. When the warning display mode is set, the process proceeds to step S103. On the other hand, when the warning display mode is not set, the process proceeds to step S105.

In step S103, the CPU 114 performs the warning display on the display unit 113 for threshold (c) seconds, as illustrated in FIG. 17B. Subsequently, in step S104, the CPU 114 performs the image pickup object loss determination processing again in the same manner as that in step S100. Subsequently, in step S105, the CPU 114 makes the same determination as that in step S101 based on the determination result in step S104, and further determines whether a maximum angle of view has been reached. When it is determined that the object has been lost, or when it is determined that the maximum angle of view has been reached, the process proceeds to step S106. On the other hand, when it is determined that the object has not been lost, that is when the user is capturing the image pickup object, and that it is not the maximum angle of view, the process ends without doing anything.

In step S106, the CPU 114 controls the lens driving motor 213 and zooms out to display the predetermined angle of view, as illustrated in FIG. 17C. Subsequently, in step S107, the CPU 114 performs the image pickup object loss determination processing again in the same manner as that in step S100. Subsequently, in step S108, the CPU 114 makes the same determination as that in step S101 based on the determination result in step S107. When it is determined that the object has been lost, the process returns to step S102. That is, when the object has been lost, steps S102 to S106 are repeated until the object is found, and the angle of view is gradually widened. This can avoid expanding the angle of view to the maximum at once and greatly increasing the number of objects to be searched for. On the other hand, when it is determined that the object has not been lost, the process proceeds to step S109.

In step S109, the CPU 114 controls the lens driving motor 213 to zoom in to the angle of view in which the gaze area is enclosed. Subsequently, in step S1, the CPU 114 determines whether or not the angle of view is before zoom out. When it is determined that the angle of view before the zoom out has been restored, the process ends. When the processing ends, a display form is as illustrated in FIG. 17D. On the other hand, when the angle of view is not the one before the zoom out, the process proceeds to step S111. In step S111, the CPU 114 determines whether or not the user has panned the camera in order to capture the image pickup object 802 in a center of a screen. When it is determined that the camera has been panned, the process returns to step S109. On the other hand, when it is not determined that the camera has been panned, the process proceeds to step S112. The determination in step S111 may be made based on whether or not the image pickup object 802 is located in the center direction in the screen.

In step S112, the CPU 114 determines whether or not the angle of view is the same for a threshold (d) time or more, or whether or not the release button 5 is pressed to perform the image pickup operation. When the angle of view is the same for threshold (d) time or more, or when the image pickup operation is performed, the process ends. On the other hand, when the angle of view is not the same for the threshold (d) time or more and the image pickup operation is not performed, the process returns to step S11. The display form is as illustrated in FIG. 17D when the processing is completed.

Figure 19:
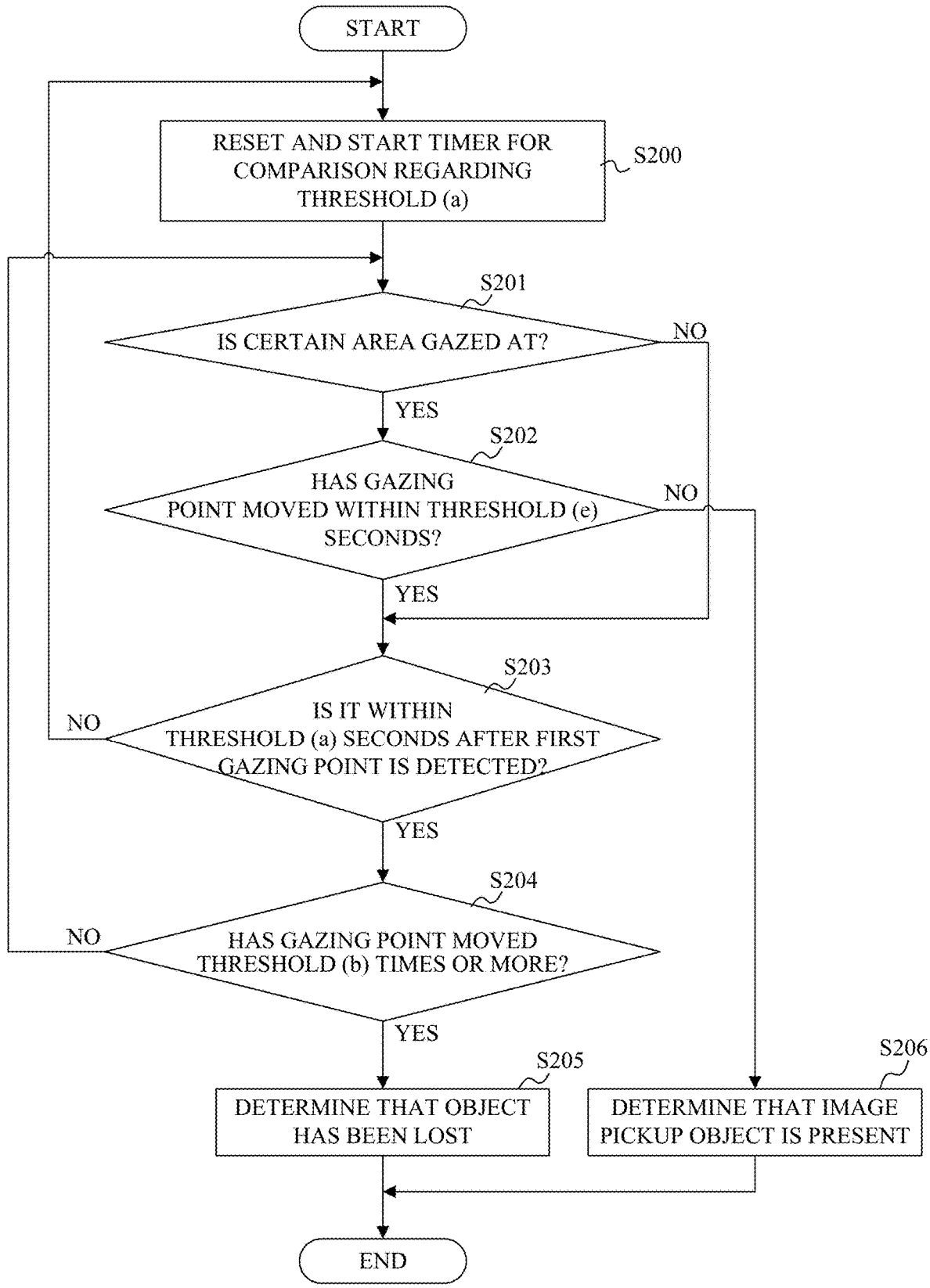
FIG. 19 is a flowchart illustrating a control method according to the fifth embodiment.

Next, a description will be given of the image pickup object loss determination processing according to this embodiment with reference to FIG. 19. FIG. 19 is a flowchart illustrating a control method (image pickup object loss determination processing) according to this embodiment.

First, in step S200, the CPU 114 resets a timer for measuring the number of movements of a gazing point within threshold (a) seconds, and thereafter starts the timer. Subsequently, in step S201, the CPU 114 determines whether or not the gazing point is present that has been detected in the visual line detection routine. When the gazing point is present, the process proceeds to step S202. On the other hand, when the gazing point is not present, the process proceeds to step S203.

In step S202, the CPU 114 determines whether or not the gazing point determined in step S201 has moved within threshold (e) seconds. When the gazing point has moved, the process proceeds to step S203. On the other hand, when the gazing point has not moved, the process proceeds to step S206.

In step S203, the CPU 114 determines whether or not it is within the threshold (a) seconds after detecting the first gazing point. When it is within the threshold (a) seconds after the first gazing point is detected, the process proceeds to step S204. On the other hand, when it is not within the threshold (a) seconds after the first gazing point is detected, the process returns to step S200.

In step S204, the CPU 114 determines whether or not the gazing point has moved threshold (b) times or more. When the gazing point has moved threshold (b) times or more, the process proceeds to step S205. On the other hand, when the gazing point has not moved threshold (b) times or more, the process returns to step S201. In step S205, the CPU 114 determines that the object has been lost, and ends the processing. In step S206, the CPU 114 determines that the image pickup object is present, and ends the processing.

As described above, in the image pickup object loss determination processing according to this embodiment, the loss determination is performed based on a fact that the gazing point is moving in a certain area within a certain specified time. According to this embodiment, it is possible to detect loss of the object and reduce a possibility of missing the image pickup timing. The various thresholds used in the image pickup object loss determination processing in step S104 may be different from the various thresholds used in the object loss determination processing in step S100. For example, in step S104, the threshold (b) used for the object loss determination may be set to a value larger than the threshold (b) used for the object loss determination in step S100, so that it may be harder to determine that the object has been lost.

Sixth Embodiment

Next, a description will be given of the sixth embodiment of the present invention with reference to FIGS. 20A to 20C and FIG. 21. This embodiment differs from the fifth embodiment in using a gazing point and a result of recognizing an object by a recognition circuit 208.

Figure 20:
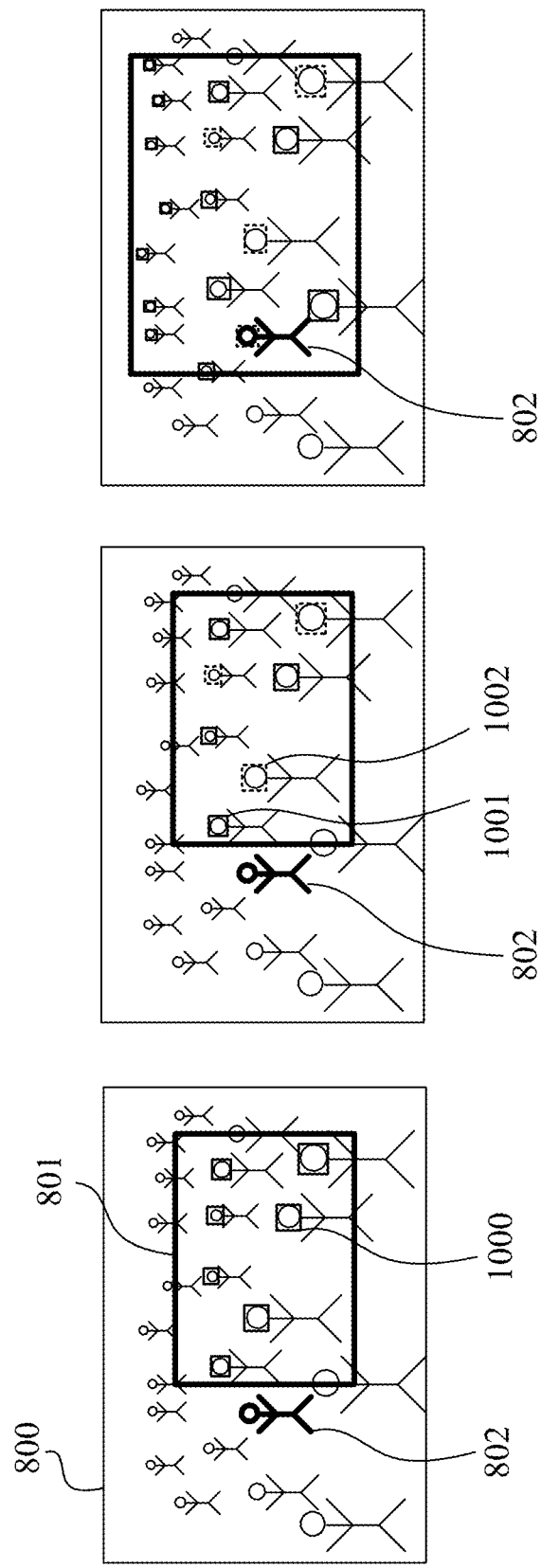
FIGS. 20A to 20C are diagrams illustrating changes in a display angle of view according to a sixth embodiment.

FIGS. 20A to 20C are diagrams illustrating changes in display angle of views according to this embodiment, and illustrate the same scenes as those in FIGS. 17A to 17D. A face frame 1000 of FIG. 20A indicates a face frame for a face of an object recognized by the recognition circuit 208. FIG. 20A illustrates that the face frame is displayed on the object of a display image 801 that is not denoted by a reference numeral in this drawing. In this embodiment, a description will be given of the face frame, but an object frame detected by the recognition circuit 208 may be displayed. A face frame 1002 illustrated in FIG. 20B is a face frame which a user has already gazed at, and a face frame 1001 is a face frame which the user has not gazed at. Although the gaze face frame 1002 is indicated by a dotted line, any display form may be used as long as the user can distinguish between a gaze frame and a non-gaze frame. For example, the face frame may be erased which has been gazed at. FIG. 20C is a view when the display angle of view is widened, as illustrated in FIG. 17C.

Figure 21:
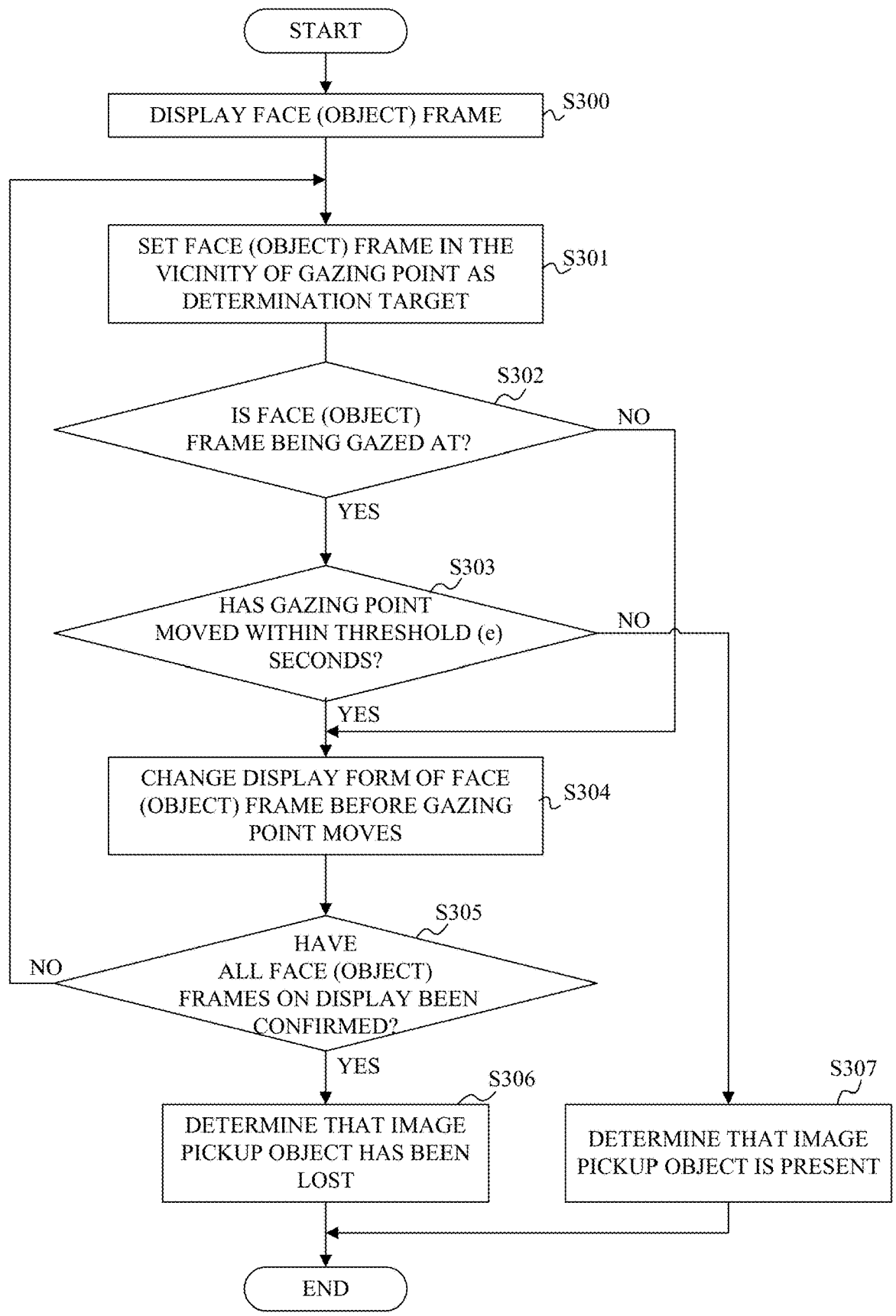
FIG. 21 is a flowchart illustrating a control method according to the sixth embodiment.

Next, a description will be given of image pickup object loss determination processing according to this embodiment with reference to FIG. 21. FIG. 21 is a flowchart illustrating a control method (image pickup object loss determination processing) according to this embodiment.

First, in step 300, the CPU 114 displays a face or object frame. When the face or object frame is displayed in advance before start of the image pickup assist processing, step S300 may not be performed. Subsequently, in step S301, the CPU 114 sets the face or object frame in the vicinity of the gazing point detected in visual line detection routine as a determination target in step S302. Subsequently, in step S302, the CPU 114 determines whether or not the face or object frame is being gazed at. A face frame within threshold (f) pixels from a center of the gaze frame may be regarded to be gazed at, because it is highly possible to be visible at the same time with the gaze frame. When the face or object frame is being gazed at, the process proceeds to step S303. On the other hand, when the face or object frame is not being gazed at, the process proceeds to step S304.

In step S303, the CPU 114 determines whether or not the gazing point has moved within threshold (e) seconds. The threshold (e) may be changed according to size of the face or object frame. When the gazing point has moved within the threshold (e) seconds, the process proceeds to step S304. On the other hand, when the gazing point has not moved within the threshold (e) seconds, the process proceeds to step S307.

In step S304, the CPU 114 changes the display form of the face or object frame before the gazing point moves, that is the frame targeted in step S301, as with the face frame 1002 of FIG. 20B. Subsequently, in step S305, the CPU 114 determines whether or not all the face or object frames on the image displayed on the display unit 113 have been confirmed. The number of times of the user gazing at one face or object frame may be changed according to the size of the face or object frame. Thereby, it may be possible to eliminate a possibility that an object has been gazed at by the user once and should have been captured, but has been missed because the object is small. When all the face or object frames on the display screen are confirmed, the process proceeds to step S306. On the other hand, when there is an unconfirmed face or object frame, the process returns to step S301. In step S306, the CPU 114 determines that the object has been lost, and ends the processing. In step S307, the CPU 114 determines that the image pickup object is present, and ends the processing.

As described above, in the image pickup object loss determination processing according to this embodiment, the loss of the object is determined according to whether or not the object frame is being gazed at. According to this embodiment, it is possible to detect the loss of the determined object and reduce a possibility of the user missing image pickup timing. Since the face frame is displayed and it is made easy to determine whether or not the user has gazed at the face frame, it is possible to prevent the same object from being repeatedly confirmed.

Seventh Embodiment

Next, a description will be given of a seventh embodiment of the present invention with reference to FIGS. 22A to 22C and FIG. 23. This embodiment differs from the sixth embodiment in that an object is a moving body.

Figures 22A, 22B, 22C:
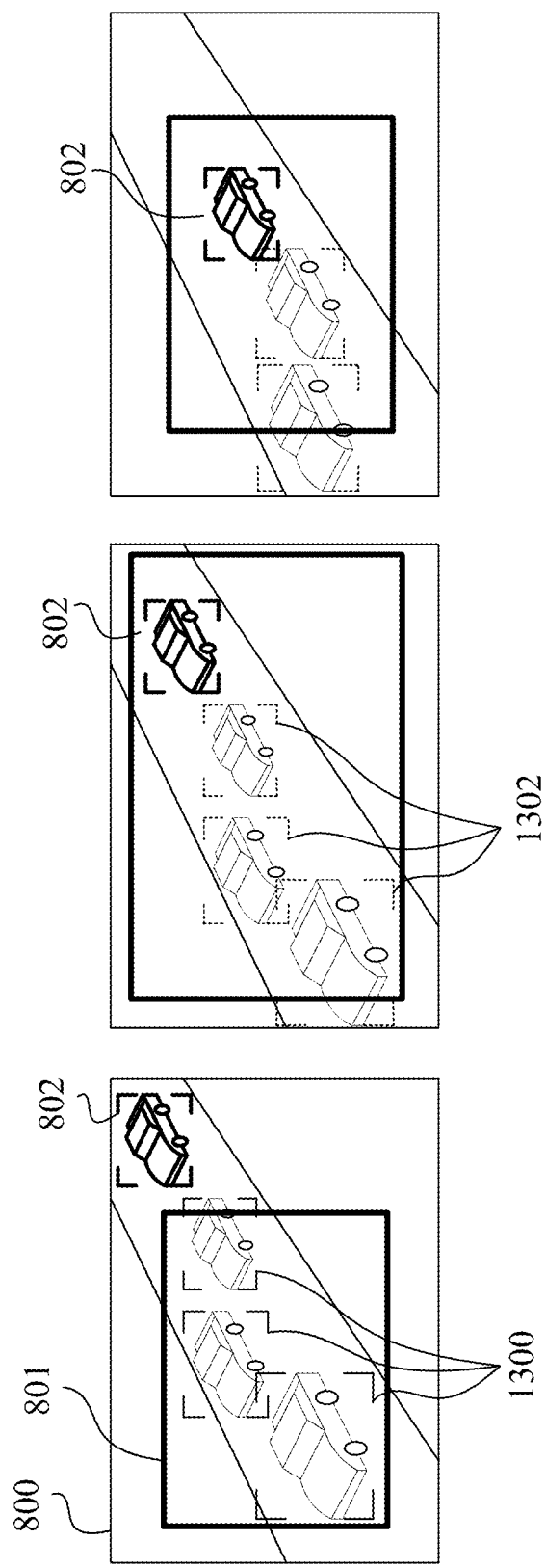
FIGS. 22A to 22C are diagrams illustrating changes in a display angle of view according to a seventh embodiment.

FIGS. 22A to 22C are diagrams illustrating changes in display angle of views according to this embodiment. FIG. 22A illustrates a display screen of the display unit 113 when a certain time is cut out during a racing car (object) moving from an upper right to a lower left. As an object frame 1300 recognized by a recognition circuit 208, frames are displayed at four corners of each object. FIG. 22B indicates a state where an image pickup object 802 enters an angle of view which has been widened, after it is determined in FIG. 22A that the image pickup object 802 does not exist and the angle of view of the image displayed by the display unit 113 is widened. An object frame 1302 indicates a face frame which the user has already gazed at with a dotted line. Although the gaze object frame 1302 is represented by the dotted line, any display form may be used as long as the user can distinguish between a gaze frame and a non-gaze frame. For example, a frame may be erased which is gazed at. As with FIG. 17D, FIG. 22C illustrates a state where zoom-in is performed to an angle of view in which the image pickup object 802 is fully enclosed or to an angle of view before zoom out, and in this case, to the angle of view of FIG. 22A.

Figure 23:
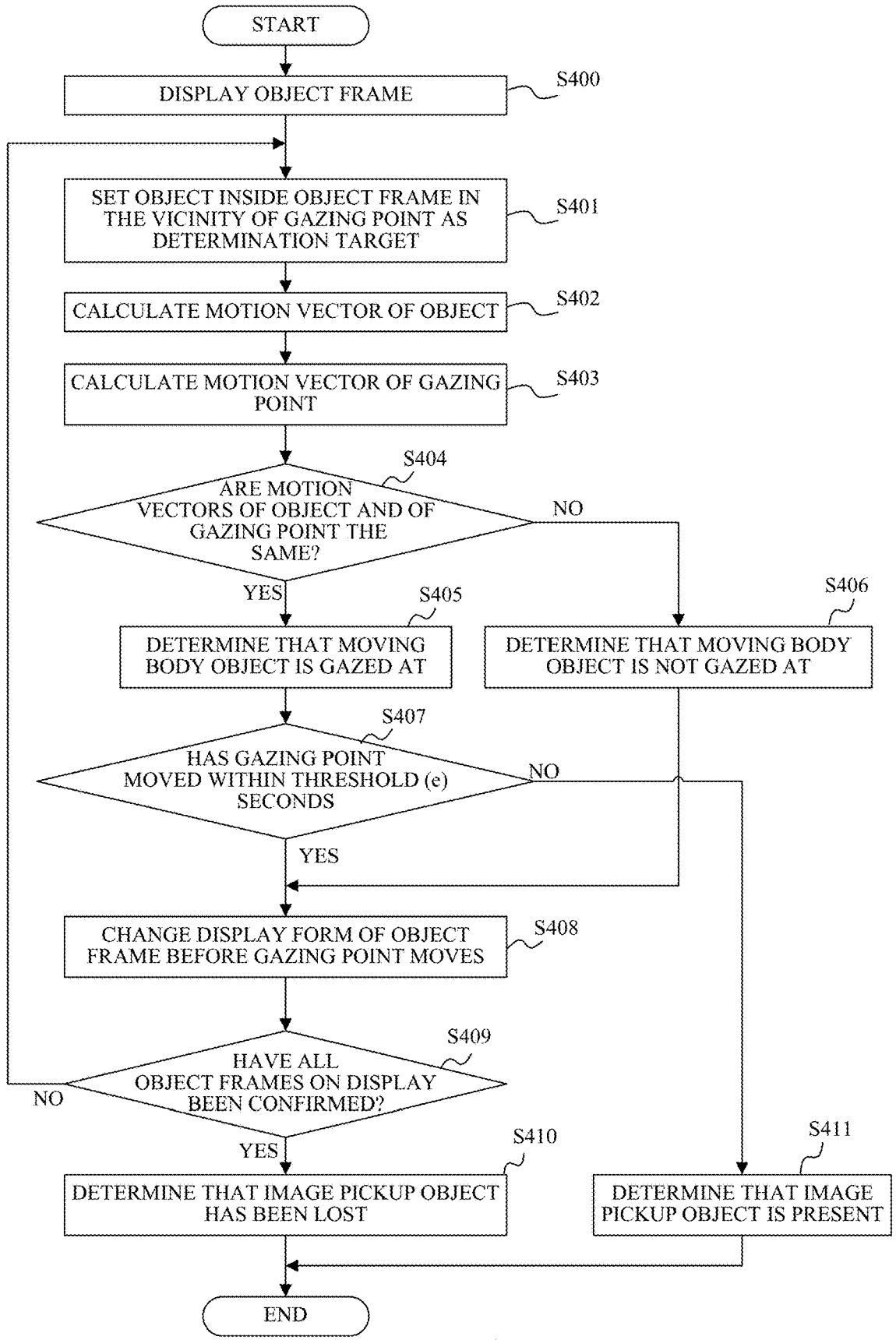
FIG. 23 is a flowchart illustrating a control method according to the seventh embodiment.

Next, a description will be given of image pickup object loss determination processing according to this embodiment with reference to FIG. 23. FIG. 23 is a flowchart illustrating a control method (image pickup object loss determination processing) according to this embodiment.

First, in step S400, the CPU 114 displays an object frame. If the object frame is displayed in advance before start of image pickup assist processing, step S400 may not be performed. Subsequently, in step S401, the CPU 114 sets an object in the vicinity of a gazing point detected in visual line detection routine as a determination target in step S402. Subsequently, in step S402, the CPU 114 calculates a motion vector (motion information) of the object from a previous frame and a current frame by a block matching method or the like. Another method may be used for the motion vector calculation. Subsequently, in step S403, the CPU 114 calculates a motion vector of an object from a previous frame and a current frame of an image used in a visual line detection by the same method as that in step S402. The motion vector calculation may use a method different from that in step S402.

Subsequently, in step S404, the CPU 114 determines whether or not the motion vector of the object calculated in step S402 and the motion vector of the gazing point calculated in step S403 are the same. When the motion vector of the object and the motion vector of the gazing point are the same, the process proceeds to step S405. On the other hand, when the motion vector of the object and the motion vector of the gazing point are different, the process proceeds to step S406.

In step S405, the CPU 114 determines that the object of a moving body is being gazed at, and the process proceeds to step S407. In step S406, the CPU 114 determines that the object of the moving body is not being gazed at, and the process proceeds to step S408. In step S407, the CPU 114 determines whether or not the gazing point has moved within threshold (e) seconds. The threshold (e) may be changed according to size of the object frame. When the gazing point moves within the threshold (e) seconds, the process proceeds to step S408. On the other hand, when the gazing point has not moved within the threshold (e) seconds, the process proceeds to step S411.

In step S408, the CPU 114 changes the display form of the object frame before the gazing point moves, that is, the object frame targeted in step S401, as with the object frame 1302 illustrated in FIG. 22B. Subsequently, in step S409, the CPU 114 determines whether or not all the object frames on the image displayed on the display unit 113 have been confirmed. The number of times of the user gazing at one object frame may be changed according to the size of the object frame. Thereby, it may be possible to eliminate a possibility that an object has been gazed at by the user once and should have been captured, but has been missed because the object is small. When all of the object frames on the display screen have been confirmed, the process proceeds to step S410. On the other hand, when there is an unconfirmed object frame, the process returns to step S401. In step S410, the CPU 114 determines that the object has been lost, and ends the processing. In step S411, the CPU 114 determines that the image pickup object exists, and ends the processing.

As described above, in the image pickup object loss determination processing, it is determined whether or not the object (moving body) is being gazed at by using the motion vector of the object frame and the motion vector of the gazing point, and a determination is performed of object loss according to a motion of the gazing point. According to this embodiment, it is possible to detect the loss of the determined object and reduce a possibility of the user missing image pickup timing.

As described above, in the fifth to seventh embodiments, a control unit (CPU 114) changes an angle of view when the control unit determines that a gazing point position has been changed. When the control unit determines that the gazing point position has been changed threshold number of times or more within a threshold time, the control unit may change the angle of view. The control unit may change the angle of view by cropping an image and changing the angle of view, or by driving an optical system to change an imaging position.

In the fifth to seventh embodiments, when the control unit determines that the gazing point position has been changed, the control unit performs a warning display on a display unit (display unit 113). When the control unit determines that the gazing point position has been changed threshold number of times or more within a threshold time, the control unit performs the warning display.

An image processing apparatus may include a recognition unit (recognition circuit 208) configured to recognize an object from an image. When the control unit determines that the gazing point position corresponds to a position of the object recognized by the recognition unit and that the gazing point position has been changed more than threshold times or more within a threshold time, the control unit changes the angle of view. When the control unit determines that the gazing point position corresponds to a position of the object recognized by the recognition unit and that the gazing point position has been changed more than the threshold times within the threshold time, the control unit may perform warning display. The control unit may display object recognition information on the display unit for each of a first object and a second object recognized by the recognition unit. When the gazing point position corresponds to the position of the first object or the second object recognized by the recognition unit, the control unit changes a display form of object recognition information. When the control unit determines that a gaze time on the first object is less than or equal to a threshold and the gazing point position has changed from the first object to the second object, the control unit may change a display form of the object recognition information for the first object. The control unit may determine whether or not the gazing point position corresponds to the position of the object recognized by the recognition unit based on motion information on the object recognized by the recognition unit and motion information on the gazing point position. That is, when the motion information on the object and the motion information on the gazing point position match in a degree equal to or more than a threshold, the control unit determines that the gazing point position corresponds to the position of the object recognized by the recognition unit.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image processing apparatus according to each embodiment can control zooming in to a focal length at which a gazing point position is enclosed within an angle of view after a cancellation of the image pickup assist function, by using information on the gazing point position as a condition for determining the cancellation of an image pickup assist function. Thus, according to each embodiment, it is possible to provide an image processing apparatus, an image pickup apparatus, and a control method each of which can make it easy to recapture an object that is lost from the image pickup angle of view, and to prevent a loss of an image pickup opportunity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-017856, filed on Feb. 5, 2020, and 2020-069707, filed on Apr. 8, 2020 which are hereby incorporated by reference herein in their entirety.

What is claimed is:

1. An image processing apparatus comprising:
a display unit configured to display an image captured via an optical system; and
one or more processors and/or circuitry which functions as:
an estimation unit configured to estimate a gazing point position of a user on the display unit; and
a control unit configured to change a zoom position of an image displayed on the display unit,
wherein when start is instructed of image pickup assist control, the control unit zooms out the image displayed on the display unit from a first zoom position to a second zoom position on more wide-angle side than the first zoom position, and
wherein when stop is instructed of the image pickup assist control, the control unit zooms in on a zoom-out image from the second zoom position to a third zoom position on more telephoto side than the second zoom position, based on the gazing point position estimated by the estimation unit.

2. The image processing apparatus according to claim 1, wherein the control unit zooms in on the zoom-out image to the third zoom position within a range in which the gazing point position is displayed on the display unit.

3. The image processing apparatus according to claim 1, wherein the control unit displays a frame including the gazing point position on the display unit, and wherein the frame has a size corresponding to an angle of view corresponding to the first zoom position.

4. The image processing apparatus according to claim 1, wherein when the control unit determines that an angle of view frame of the first zoom position and a frame including the gazing point position overlap, the control unit determines that the stop is instructed of the image pickup assist control.

5. The image processing apparatus according to claim 1, wherein the control unit determines that the stop is instructed of the image pickup assist control, based on operation on the operation unit by the user.

6. The image processing apparatus according to claim 1, wherein the control unit changes a zoom-in speed from the second zoom position to the third zoom position, based on a gaze time on the gazing point position.

7. The image processing apparatus according to claim 1, wherein when a gaze time on the gazing point position exceeds a predetermined time, the control unit determines that the stop is instructed of the image pickup assist control.

8. The image processing apparatus according to claim 1, wherein the control unit changes a zoom-in speed from the second zoom position to the third zoom position, based on a time it takes for a distance between an angle of view frame corresponding to the first zoom position and a frame including the gazing point position to become smaller than a predetermined distance.

9. An image pickup apparatus comprising:
a first image sensor configured to acquire a first image by photoelectrically converting an optical image formed via a first optical system;
a second image sensor configured to acquire a second image of a wider angle than the first image by photoelectrically converting an optical image formed via a second optical system;
a display unit configured to display at least one of the first image and the second image; and
one or more processors and/or circuitry which functions as:
an estimation unit configured to estimate a gazing point position of a user on the display unit; and
a control unit configured to control the display unit,
wherein the control unit displays the second image on the display unit, and
wherein when an angle of view frame of the first image superimposed on the second image and a display frame of the gazing point position in the second image overlap, the control unit switches from the second image displayed on the display unit to the first image.

10. A control method of an image processing apparatus including a display unit configured to display an image captured via an optical system, an estimation unit configured to estimate a gazing point position of a user on the display unit, and a control unit configured to change a zoom position of an image displayed on the display unit, the control method comprising:
zooming out the image displayed on the display unit from a first zoom position to a second zoom position which is on more wide-angle side than the first zoom position, in response to a start instruction for image pickup assist control; and
zooming in on a zoom-out image from the second zoom position to a third zoom position on more telephoto side than the second zoom position based on the gazing point position estimated by the estimation unit, in response to a stop instruction for the image pickup assist control.

11. An image processing apparatus comprising:
a display unit configured to a display an image captured via an optical system; and
one or more processors and/or circuitry which functions as:
an estimation unit configured to estimate a gazing point position of a user on the display unit; and
a control unit configured to change a zoom position of an image displayed on the display unit,
wherein when the control unit determines that the gazing point position has been changed first threshold times or more within a threshold time, the control unit performs warning display on the display unit, and
wherein when the control unit determines that the gazing point position has been changed second threshold times or more within a threshold time after the warning display, the control unit changes the zoom position.

12. The image processing apparatus according to claim 11, further comprising a recognition unit configured to recognize a first object and a second object from the image,
wherein the control unit displays object recognition information on the display unit for each of the first object and the second object recognized by the recognition unit, and
wherein when the gazing point position corresponds to a position of the first object and or the second object recognized by the recognition unit, the control unit changes a display form of the object recognition information.

13. The image processing apparatus according to claim 12,
wherein when the control unit determines that a gaze time on the first object is equal to or less than a threshold and that the gazing point position changes from the first object to the second object, the control unit changes the display form of the object recognition information on the first object.

14. An image processing apparatus comprising:
a display unit configured to a display an image captured via an optical system; and
one or more processors and/or circuitry which functions as:
an estimation unit configured to estimate a gazing point position of a user on the display unit;
a control unit configured to change a zoom position of an image displayed on the display unit; and
a recognition unit configured to recognize an object from the image,
wherein when the control unit determines that the gazing point position corresponds to a position of the object recognized by the recognition unit and the gazing point position has been changed threshold times or more within a threshold time, the control unit changes the zoom position.

15. The image processing apparatus according to claim 14,
wherein the control unit determines whether or not the gazing point position corresponds to a position of the object recognized by the recognition unit, based on motion information on the object recognized by the recognition unit and motion information on the gazing point position.

16. A control method of an image processing apparatus including a display unit configured to a display an image captured via an optical system, an estimation unit configured to estimate a gazing point position of a user on the display unit, and a control unit configured to change a zoom position of an image displayed on the display unit, the control method comprising:
performing warning display on the display unit when the control unit determines that the gazing point position has been changed first threshold times or more within a threshold time; and
changing the zoom position when the control unit determines that the gazing point position has been changed second threshold times or more within a threshold time after the warning display.

17. A control method of an image processing apparatus including a display unit configured to a display an image captured via an optical system, and an estimation unit configured to estimate a gazing point position of a user on the display unit, a control unit configured to change a zoom position of an image displayed on the display unit, and a recognition unit configured to recognize an object from the image, the control method comprising:
changing the zoom position when the control unit determines that the gazing point position corresponds to a position of the object recognized by the recognition unit and the gazing point position has been changed threshold times or more within a threshold time.

* * * * *